(12) United States Patent
Nakamura

(10) Patent No.: US 8,446,506 B2
(45) Date of Patent: May 21, 2013

(54) SOLID-STATE IMAGING DEVICE

(75) Inventor: Kenichi Nakamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 280 days.

(21) Appl. No.: 13/049,313

(22) Filed: Mar. 16, 2011

(65) Prior Publication Data
US 2011/0234872 A1   Sep. 29, 2011

(30) Foreign Application Priority Data
Mar. 24, 2010   (JP) ................................. 2010-068765

(51) Int. Cl.
*H04N 3/14* (2006.01)
*H04N 5/335* (2011.01)

(52) U.S. Cl.
USPC ....................................................... 348/302

(58) Field of Classification Search
USPC ................. 348/207.99, 222.1, 266, 294, 302, 348/303, 304, 308
See application file for complete search history.

(56) References Cited

U.S. PATENT DOCUMENTS

| | | | | |
|---|---|---|---|---|
| 6,947,087 B2 * | 9/2005 | Egawa et al. | ................. | 348/304 |
| 7,129,883 B2 * | 10/2006 | Muramatsu et al. | .......... | 341/164 |
| 7,532,148 B2 * | 5/2009 | Muramatsu et al. | .......... | 341/169 |
| 7,830,436 B2 * | 11/2010 | Sumi et al. | ..................... | 348/300 |
| 8,149,304 B2 * | 4/2012 | Murakami | ..................... | 348/245 |
| 8,339,490 B2 * | 12/2012 | Wakabayashi et al. | ........ | 348/294 |
| 2001/0005227 A1 * | 6/2001 | Egawa et al. | ................. | 348/304 |
| 2005/0168602 A1 * | 8/2005 | Sumi et al. | ..................... | 348/294 |
| 2008/0211951 A1 * | 9/2008 | Wakabayashi et al. | ....... | 348/308 |
| 2010/0079611 A1 * | 4/2010 | Suzuki et al. | .............. | 348/222.1 |
| 2010/0182473 A1 | 7/2010 | Nakamura | | |

FOREIGN PATENT DOCUMENTS

| | | |
|---|---|---|
| JP | 2000-32357 | 1/2000 |
| JP | 2004-7471 | 1/2004 |
| JP | 2005-318544 | 11/2005 |

OTHER PUBLICATIONS

Hideo Sunami, et al., "Memory Device/Image Sensor", Maruzen Co., 23(b), Fig. 2, Dec. 20, 2009, p. 58 (with English Abstract).

* cited by examiner

*Primary Examiner* — Nicholas Giles
(74) *Attorney, Agent, or Firm* — Oblon, Spivak, McClelland, Maier & Neustadt, L.L.P.

(57) ABSTRACT

According to one embodiment, the data transfer circuit outputs n bits for each N columns (n≧2) in the pixel array among digital data of a predetermined number of bits digitally converted in accordance with the column selection signal which collectively and sequentially selects N columns (N≧2) in the pixel array by using one data line. One data line is commonly and correspondingly connected to one differential input terminals of $2^n-1$ differential amplifier circuits arranged in the column direction in an input stage of the signal processing circuit, and corresponding one of $2^n-1$ reference voltage lines is connected to the other differential input terminals.

21 Claims, 23 Drawing Sheets

FIG.9

| Reg. Data | | NORMAL PHASE INTERNAL NODE | | |
|---|---|---|---|---|
| Dn+1 | Dn | D3 | D2 | D1 |
| 1 | 1 | 1 | 1 | 1 |
| 1 | 0 | 0 | 1 | 1 |
| 0 | 1 | 0 | 0 | 1 |
| 0 | 0 | 0 | 0 | 0 |

8a: REFERENCE VOLTAGE DRIVE CIRCUIT GROUP,
15: CONTROL SIGNAL DRIVE CIRCUIT GROUP

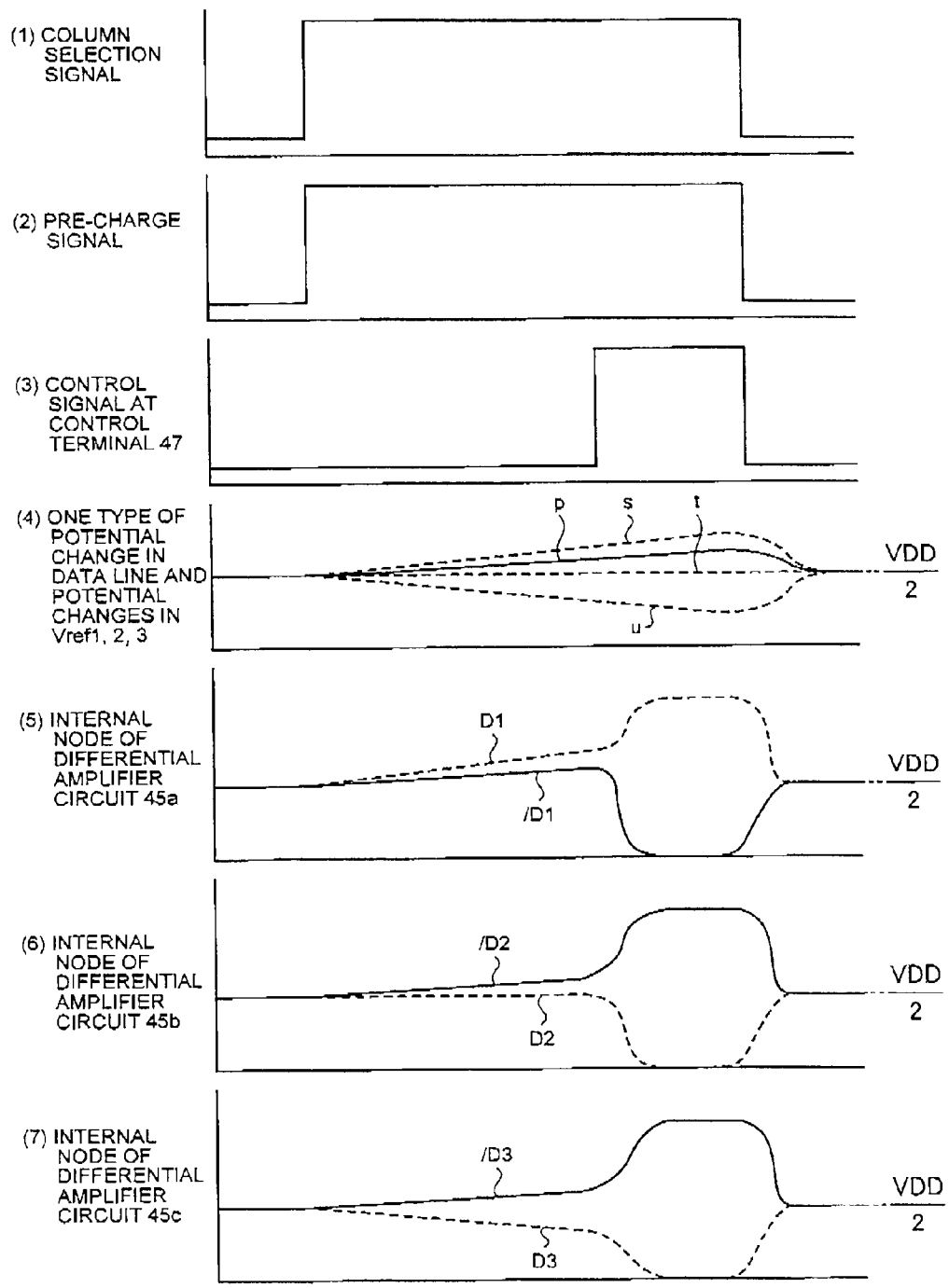

ND STATE IMAGING DEVICE

CROSS-REFERENCE TO RELATED APPLICATIONS

This application is based upon and claims the benefit of priority from the prior Japanese Patent Application No. 2010-068765, filed on Mar. 24, 2010; the entire contents of which are incorporated herein by reference.

FIELD

Embodiments described herein relate generally to a solid-state imaging device.

BACKGROUND

As a solid-state imaging device, for example, a CMOS image sensor has a configuration in which a sample hold signal conversion circuit disposed for each column in a pixel array acquires a voltage signal outputted by each pixel in a selected row in the pixel array according to an amount of light and converts the voltage signal into a digital signal, and a selected sample hold signal conversion circuit in a column sequentially transfers the converted digital signals to a signal processing circuit and performs image processing on the digital signals, and thereby a predetermined two-dimensional image is obtained.

The sample hold signal conversion circuit includes an analog-digital converter (ADC) that converts a voltage signal outputted by a pixel into, for example, a 10-bit digital signal, a register circuit that holds the 10-bit digital signal, and a data transfer circuit that transfers in parallel the 10-bit digital signal held by the register circuit to the signal processing circuit.

In summary, the sample hold signal conversion circuit in a conventional CMOS image sensor includes data transfer circuits, the number of which is the same as the number of bits of the converted digital signal in the column direction, and each of which is configured to transfer data one bit at a time for each column. However, in recent years, the number of pixels included in a CMOS image sensor tends to increase, and as the number of pixels increases, the number of columns also increases. Therefore, in the conventional transfer method in which data is transferred one bit at a time for each column, there are problems that the circuit scale of the data transfer circuit increases and the data transfer takes a long time.

BRIEF DESCRIPTION OF THE DRAWINGS

FIG. 9 is a diagram for explaining an operation in which a signal processing circuit shown in FIG. 2 calculates transferred 2 bits of 2 columns from an output of the image data receiving circuit;

FIG. 24 is a waveform diagram for explaining potential changes in 2 nodes in each of three differential amplifier circuits that receive 2-bit data.

DETAILED DESCRIPTION

In general, according to one embodiment, a solid-state imaging device includes a plurality of vertical signal lines, a column selection circuit, a sample hold signal conversion circuit, a plurality of reference voltage drive circuits, and a plurality of differential amplifier circuits.

Each of the plurality of vertical signal lines is arranged for each column in a pixel array and transmits a pixel signal from a pixel.

The column selection circuit outputs a column selection signal which collectively and sequentially selects N columns (N≧2) in the pixel array at a predetermined time interval.

The sample hold signal conversion circuit includes a plurality of analog-digital converters to which the image signals are inputted from the plurality of vertical signal lines in a one-to-one relationship with the analog-digital converters, and a plurality data transfer circuits that transfer n bits for each n columns (n≧2) in the pixel array among digital data of a predetermined number of bits converted by each of the plurality of analog-digital converters by using one data line according to the column selection signal.

The plurality of reference voltage drive circuits are arranged in one-to-one relationship with the data transfer circuits in a row direction and each of which individually drives common $2^n-1$ reference voltage lines in accordance with the column selection signal.

The plurality of differential amplifier circuits are provided in an input stage of a signal processing circuit that receives digital data from the sample hold signal conversion circuit and include $2^n-1$ differential amplifier circuits provided for each of the data transfer circuits which are arranged in a column direction and the number of which is the same as the number of bits of the digital data, where the one data line is commonly connected to one differential input terminals of the $2^n-1$ differential amplifier circuits, and corresponding one of the $2^n-1$ reference voltage lines is individually connected to the other differential input terminals.

Exemplary embodiments of the solid-state imaging device will be explained below in detail with reference to the accompanying drawings. The present invention is not limited to the following embodiments.

Figure 1:
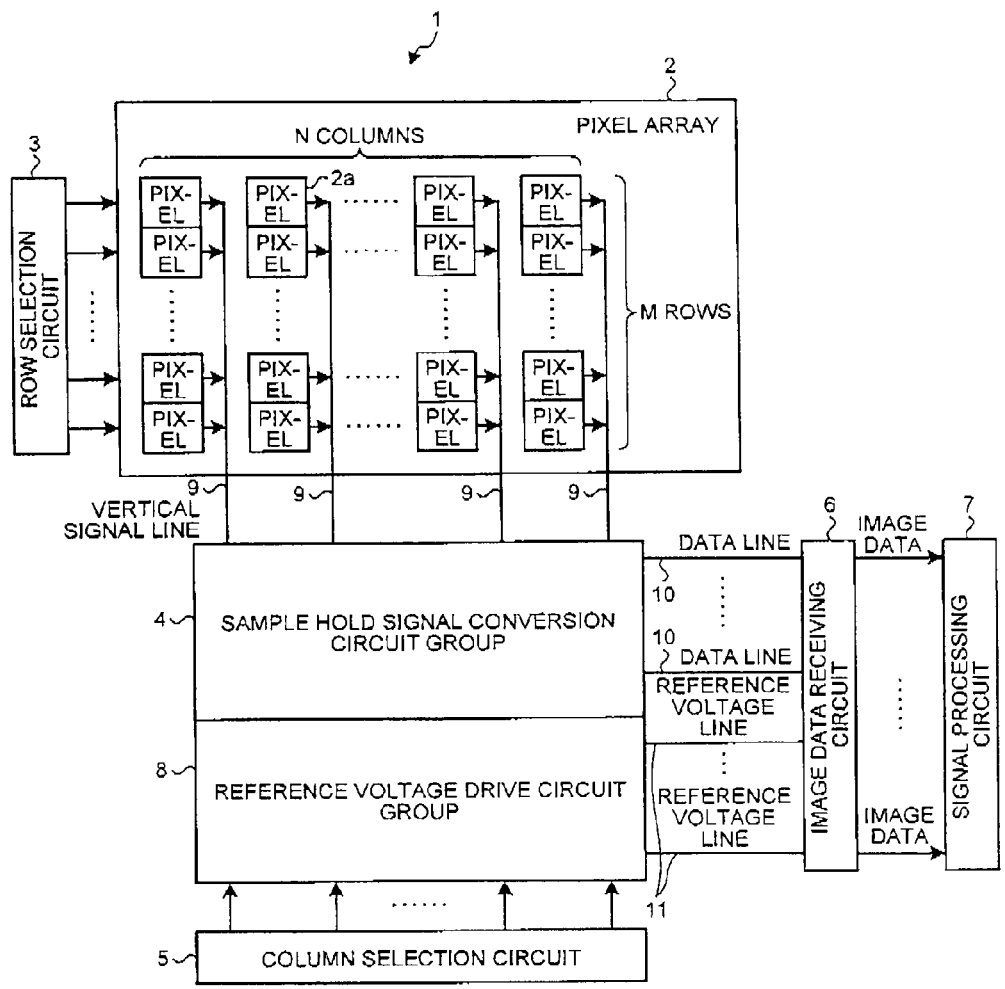
FIG. 1 is a block diagram showing a main configuration of a solid-state imaging device according to an embodiment.

FIG. 1 is a block diagram showing a main configuration of a solid-state imaging device according to an embodiment. In FIG. 1, a CMOS image sensor 1, which is a solid-state imaging device of this embodiment, has a general configuration including a pixel array 2, a row selection circuit 3, a sample hold signal conversion circuit group 4, a column selection circuit 5, and a signal processing circuit 7 having an image data receiving circuit 6 in its input stage, and further, in the general configuration, the sample hold signal conversion circuit group 4, the column selection circuit 5, and the image data receiving circuit 6 are modified according to this embodiment and a reference voltage drive circuit group 8 is added.

First, the general configuration will be briefly described. In the pixel array 2, pixels 2a are arranged in an array of N columns and M rows, and a vertical signal line 9 to which output terminals of a column of the pixels 2a are connected in parallel is provided for each column. The vertical signal line 9 of each column is connected to the sample hold signal conversion circuit group 4. The row selection circuit 3 collectively selects and activates N pixels 2a in one row for each row of the pixel array 2. Specifically, pixel signals (voltage signals) corresponding to amounts of light outputted from the N pixels 2a in one row selected from the pixel array 2 are transferred through the vertical signal lines 9 of each column and inputted into the sample hold signal conversion circuit group 4.

Generally, the column selection circuit 5 repeatedly outputs a column selection signal which sequentially selects each column in the pixel array 2 at a predetermined time interval. Each column selection signal is sequentially inputted into the sample hold signal conversion circuit group 4.

Generally, the sample hold signal conversion circuit group 4 includes sample hold signal conversion circuits, the number of which is the same as the number of the columns N in the pixel array 2. Each of the N sample hold signal conversion circuits is provided in a one-to-one relationship with the vertical signal line 9 of each column in the pixel array 2, and receives a voltage signal from a corresponding vertical signal line 9. The sample hold signal conversion circuit includes an analog-digital converter (ADC) configured to convert the voltage signal into a digital signal (for example, 10-bit digital signal), a register circuit configured to hold the converted 10-bit digital signal, and 10 data transfer circuits configured to transfer in parallel 10-bit image data held by the register circuit to the image data receiving circuit 6 in accordance with the column selection signal from the column selection circuit 5. In this case, data lines 10 between the 10 data transfer circuits and the image data receiving circuit 6 are formed of a twisted pair line.

The image data receiving circuit 6 in a general configuration includes 10 differential amplifier circuits whose differential input terminals are connected to the 10 twisted pair lines used by the 10 data transfer circuits arranged in the column direction as described above and a circuit configured to generate a control signal to collectively activate the 10 differential amplifier circuits in synchronization with output timing of each column selection signal outputted by the column selection circuit 5 for each column.

The column selection circuit 5 according to this embodiment repeatedly outputs a column selection signal which collectively and sequentially selects N columns ($N \geq 1$) in the pixel array 2 at a predetermined time interval. Each column selection signal is inputted into the sample hold signal conversion circuit group 4 and the added reference voltage drive circuit group 8 according to this embodiment.

In the sample hold signal conversion circuit group 4 according to this embodiment, in the sample hold signal conversion circuit group of the above-described general configuration, the ADC and the register circuit are not modified and provided for each column in the pixel array 2, but the data transfer circuit is configured to be able to transfer n bits for every N columns or transfer n bits in the same column in the pixel array 2 in accordance with the column selection signal from the column selection circuit 5 of this embodiment. It is one of the features of this embodiment that the data lines 10, which connect the data transfer circuits (10 data transfer circuits are included in this embodiment and the number of the data transfer circuits is 10 or less) arranged in the column direction with the image data receiving circuit 6, are respectively a single line.

The added reference voltage drive circuit group 8 includes reference voltage drive circuits, the number of which is the same as the number of the data transfer circuits according to this embodiment arranged in the row direction (in this embodiment N columns are included and the number of the columns is N or less). That is, a reference voltage drive circuit in the reference voltage drive circuit group 8 operates in accordance with a column selection signal at the same timing with a data transfer circuit disposed in a position corresponding to the reference voltage drive circuit in the row direction. Each of output terminals of the reference voltage drive circuits is connected in parallel to corresponding one of a plurality of reference voltage lines 11 connected to the image data receiving circuit 6 according to this embodiment. The reference voltage drive circuits drive the plurality of reference voltage lines 11 with reference voltages different from each other. The number of the plurality of reference voltage lines 11 is $2^n-1$ or $2^n-2$ when the number of transferred bits n of each data transfer circuit is used.

The image data receiving circuit 6 according to this embodiment includes $2^n-1$ differential amplifier circuits for each data transfer circuit arranged in the column direction. The data lines 10 through which the data transfer circuits arranged in the column direction perform n-bit transfer are commonly connected to one differential input terminals of corresponding $2^n-1$ differential amplifier circuits. On the other hand, corresponding one of $2^n-1$ reference voltage lines 11 driven by the reference voltage drive circuits of the reference voltage drive circuit group 8 is commonly connected to the other differential input terminals of $2^n-1$ differential amplifier circuits corresponding to the data transfer circuits arranged in the column direction, or corresponding one of $2^n-1$ reference voltage lines in which one reference voltage line to which a fixed voltage is applied is added to $2^n-2$ reference voltage lines 11 driven by the reference voltage drive circuits is commonly connected to the other differential input terminals of $2^n-1$ differential amplifier circuits corresponding to the data transfer circuits arranged in the column direction.

In this embodiment, the signal processing circuit 7 calculates digital data (image data) of transferred n bits from output signals of the $2^b-1$ differential amplifier circuits corresponding to the data transfer circuits according to this embodiment which are arranged in the column direction and included in the image data receiving circuit 6.

In this way, a solid-state imaging device (CMOS image sensor) which enables reduction of the circuit scale of the data transfer circuit and reduction of the transfer time can be implemented. Hereinafter, as an embodiment, a data transfer method in the solid-state imaging device according to this embodiment will be described with reference to specific examples.

First Embodiment

Figure 2:
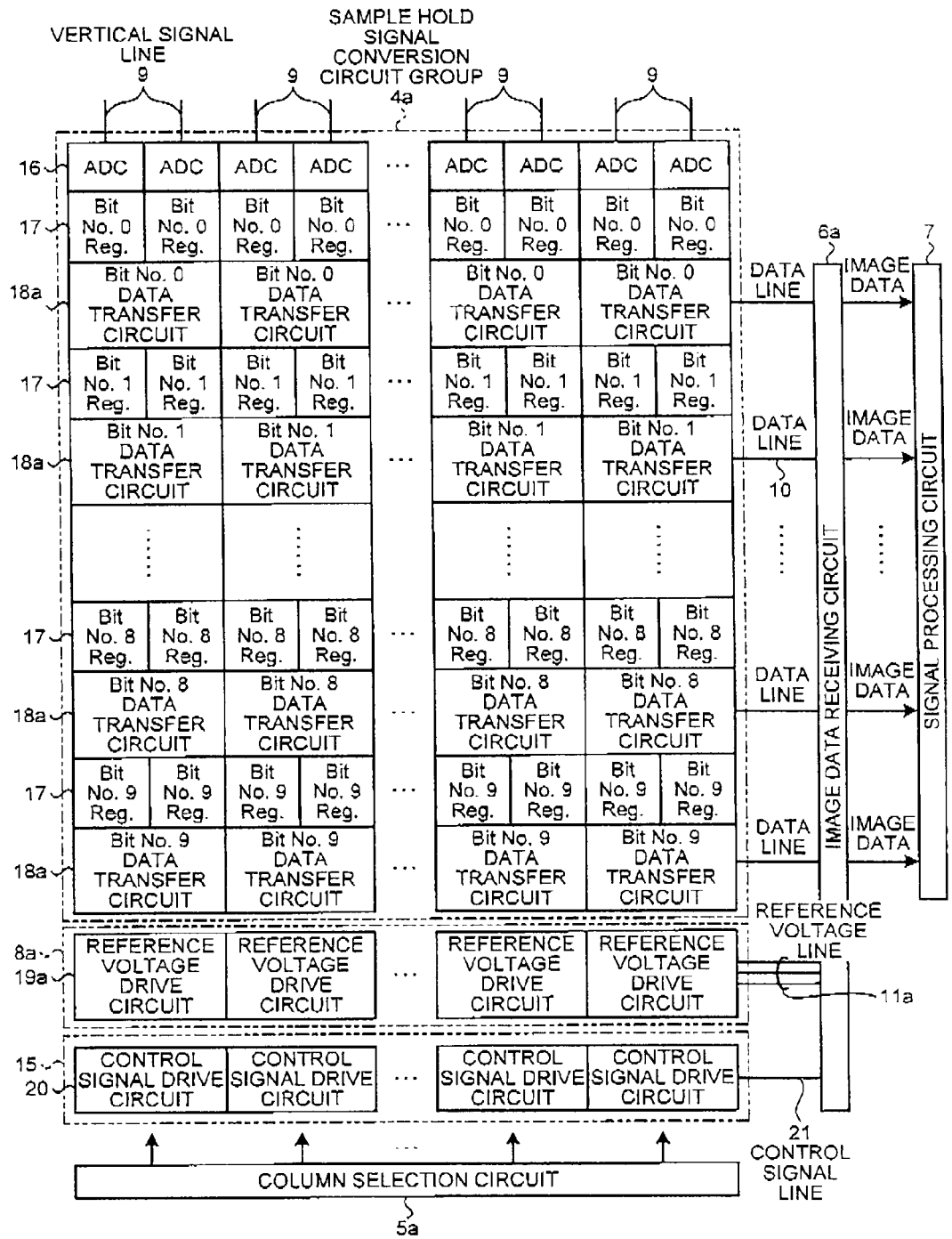
FIG. 2 is a block diagram showing a main configuration of a solid-state imaging device according to a first embodiment.

FIG. 2 is a block diagram showing a main configuration of a solid-state imaging device according to a first embodiment. In the first embodiment, a configuration example of a case in which the number of bits n transferred by each data transfer circuit is 2, and 2 bits are transferred for every 2 columns will be described. FIG. 2 shows a control signal drive circuit group 15 in addition to a sample hold signal conversion circuit group 4a, a column selection circuit 5a, an image data receiving circuit 6a, a signal processing circuit 7, and a reference voltage drive circuit group 8a.

In FIG. 2, the column selection circuit 5a repeatedly outputs a column selection signal which collectively and sequentially selects 2 columns for each 2 columns in the pixel array 2 at a predetermined time interval. Each column selection signal is inputted into the sample hold signal conversion circuit group 4a, the reference voltage drive circuit group 8a, and the control signal drive circuit group 15.

The sample hold signal conversion circuit group 4a includes 10-bit-output ADCs 16 arranged in a one-to-one relationship with the vertical signal lines 9 of each column, 10 1-bit register circuits (Bit No. 0 Reg. to Bit No. 9 Reg.) 17 that hold 10-bit data outputted by an ADC 16 corresponding to each column, and 10 data transfer circuits (Bit No. 0 data transfer circuit to Bit No. 9 data transfer circuit) 18a arranged in the column direction for every two 1-bit register circuits arranged for each 2 columns in each row direction. Therefore, the number of data line 10 connected to the image data receiving circuit 6a is 10.

The reference voltage drive circuit group 8a includes a plurality of reference voltage drive circuits 19a arranged in a one-to-one relationship with the data transfer circuits 18a for each 2 columns in the pixel array 2. The number of reference voltage lines 11a connected to the image data receiving circuit 6a is 3, and each reference voltage drive circuit 19a drives the reference voltage lines 11a in parallel.

Since the number of transferred bits n is 2, the image data receiving circuit 6a includes 3 differential amplifier circuits for each data line 10. A corresponding one of 10 data lines 10 is connected to one differential input terminals of each 3 differential amplifier circuits provided for each data line 10, and a corresponding one of the 3 reference voltage lines 11a is commonly connected to the other differential input terminals.

In this case, the 3 differential amplifier circuits provided for each data line 10 in the image data receiving circuit 6a respectively have common control terminals and a control signal for collectively activating the 3 differential amplifier circuits can be applied to the control terminals, so that a circuit which is provided in the image data receiving circuit 6a and generates the control signal in synchronization with the output timing of the column selection circuit 5a can be used. By doing so, the 3 differential amplifier circuits can be collectively activated for each 2 columns in the pixel array 2.

In the first embodiment, the operation for collectively activating the 3 differential amplifier circuits for each 2 columns is preferred to be performed in one-to-one relationship with a corresponding data transfer circuit 18a, so that the image data receiving circuit 6a includes the control signal drive circuit group 15 instead of a circuit configured to generate the control signal. This is the same in three embodiments described below.

The control signal drive circuit group 15 includes a plurality of control signal drive circuits 20 arranged in a one-to-one relationship with the data transfer circuits 18a for each 2 columns in the pixel array 2. Each control signal drive circuit 20 is configured to drive in parallel one control signal line 21 connected to the image data receiving circuit 6a in accordance with the column selection signal from the column selection circuit 5a. The control signal line 21 is connected in parallel to the control terminals of the 3 differential amplifier circuits provided for each data line 10 in the image data receiving circuit 6a.

Figure 3:
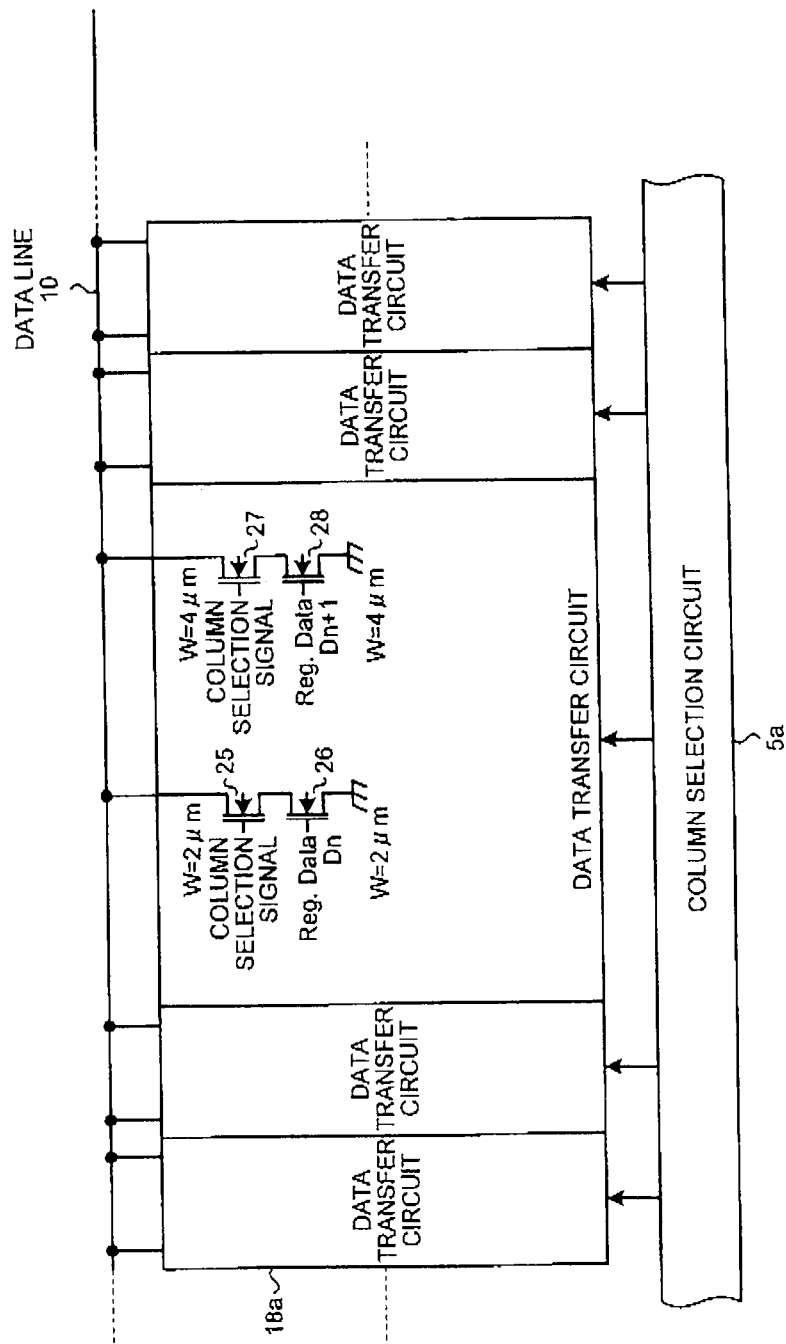
FIG. 3 is a circuit diagram showing a configuration example of a data transfer circuit shown in FIG. 2.

Next, configurations of each circuit will be specifically described with reference to FIGS. 3 to 6. FIG. 3 is a circuit diagram showing a configuration example of the data transfer circuit 18a. FIG. 3 shows that a corresponding column selection signal is inputted from the column selection circuit 5a into each of a plurality of data transfer circuits 18a arranged in the row direction. Each data transfer circuit 18a has the same configuration and includes 2 pairs (25, 26) and (27, 28) of 2 NMOS transistors connected in series between the data line 10 and the circuit ground. The column selection signal from the column selection circuit 5a is commonly inputted into each gate terminal of the 2 NMOS transistors 25 and 27 on the side of the data line 10. In the 2 NMOS transistors 26 and 28 on the side of the circuit ground, 1-bit data Reg. Data Dn held by an nth column register circuit 17 is inputted into the gate terminal of the NMOS transistor 26 and 1-bit data Reg. Data Dn+1 held by an (n+1)th column register circuit 17 is inputted into the gate terminal of the NMOS transistor 28. The gate width W of the 2 NMOS transistors 25 and 26 connected in series is the same and equal to 2 μm. The gate width W of the 2 NMOS transistors 27 and 28 connected in series is the same and equal to 4

Figure 4:
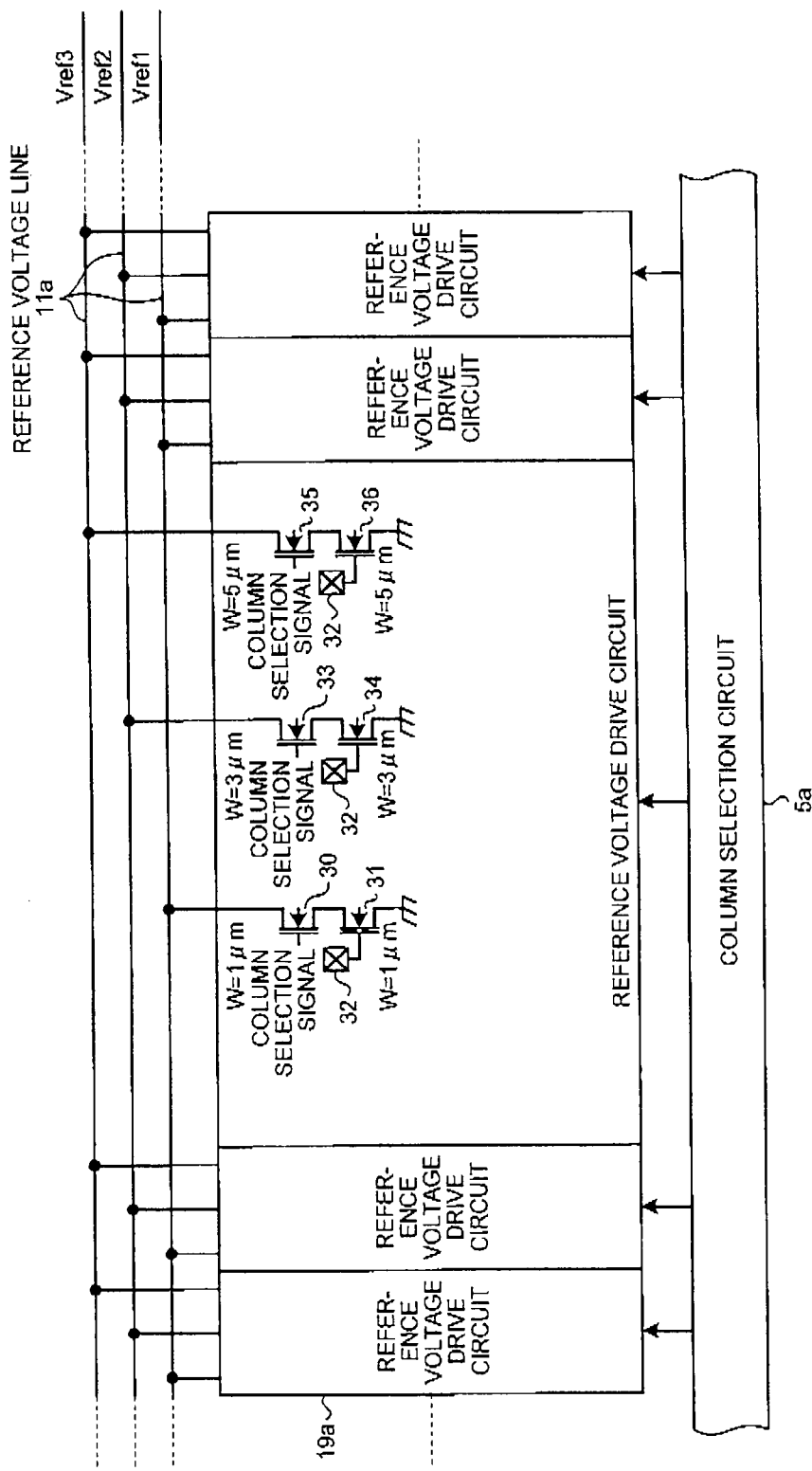
FIG. 4 is a circuit diagram showing a configuration example of a reference voltage drive circuit shown in FIG. 2.

FIG. 4 is a circuit diagram showing a configuration example of the reference voltage drive circuit 19a. FIG. 4 shows a state in which a corresponding column selection signal is inputted from the column selection circuit 5a into each of a plurality of reference voltage drive circuits 19a arranged in the row direction. Each reference voltage drive circuit 19a has the same configuration. When the 3 reference voltage lines 11a are respectively referred to as reference voltage lines Vref1, Vref2, and Vref3, the reference voltage drive circuit 19a includes 2 NMOS transistors 30 and 31 connected in series between the reference voltage line Vref1 and the circuit ground, 2 NMOS transistors 33 and 34 connected in series between the reference voltage line Vref2 and the circuit ground, and 2 NMOS transistors 35 and 36 connected in series between the reference voltage line Vref3 and the circuit ground. The column selection signal from the column selection circuit 5a is commonly inputted into each gate terminal of the 3 NMOS transistors 30, 33, and 35 on the side of the reference voltage lines Vref1, Vref2, and Vref3. A power source 32 is connected to each gate terminal of the 3 NMOS transistors 31, 34, and 36 on the side of the circuit ground. The gate width W of the 2 NMOS transistors 30 and 31 connected in series is the same and equal to 1 µm. The gate width W of the 2 NMOS transistors 33 and 34 connected in series is the same and equal to 3 µm. The gate width W of the 2 NMOS transistors 35 and 36 connected in series is the same and equal to 5 µm.

Figure 5:
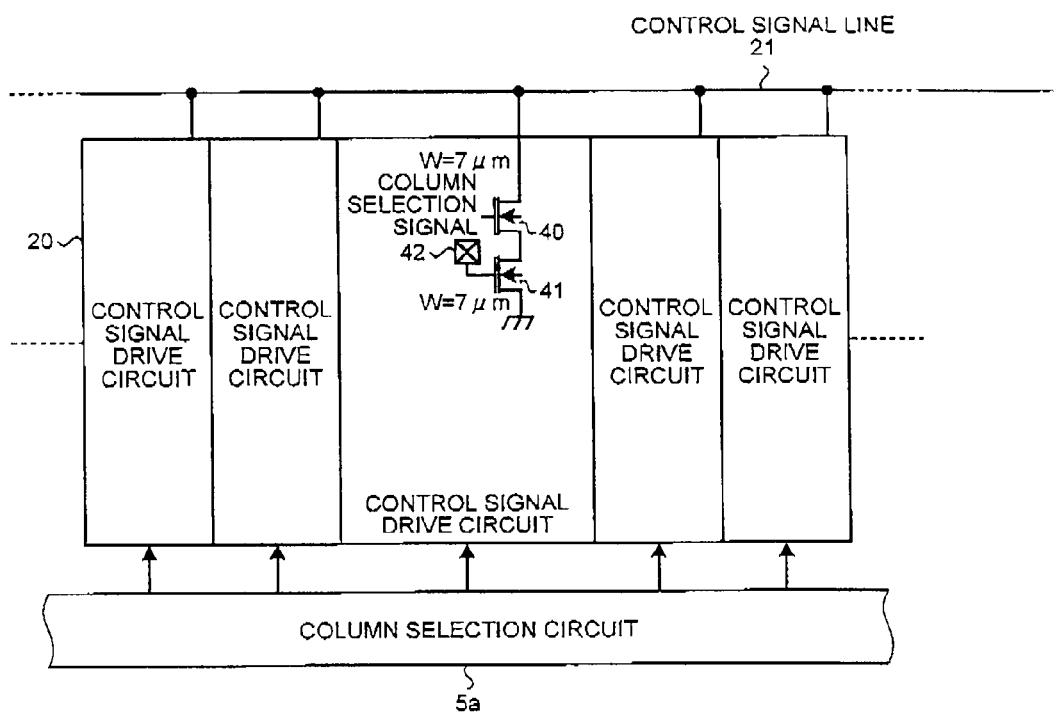
FIG. 5 is a circuit diagram showing a configuration example of a control signal drive circuit shown in FIG. 2.

FIG. 5 is a circuit diagram showing a configuration example of the control signal drive circuit 20. FIG. 5 shows a state in which a corresponding column selection signal is inputted from the column selection circuit 5a into each of a plurality of control signal drive circuits 20 arranged in the row direction. Each control signal drive circuit 20 has the same configuration and includes 2 NMOS transistors 40 and 41 connected in series between the control signal line 21 and the circuit ground. The column selection signal from the column selection circuit 5a is inputted into the gate terminal of the NMOS transistor 40 on the side of the control signal line 21. A power source 42 is connected to the gate terminal of the NMOS transistor 41 on the side of the circuit ground. The gate width W of the 2 NMOS transistors 40 and 41 connected in series is the same and equal to 7 µm.

Figure 6:
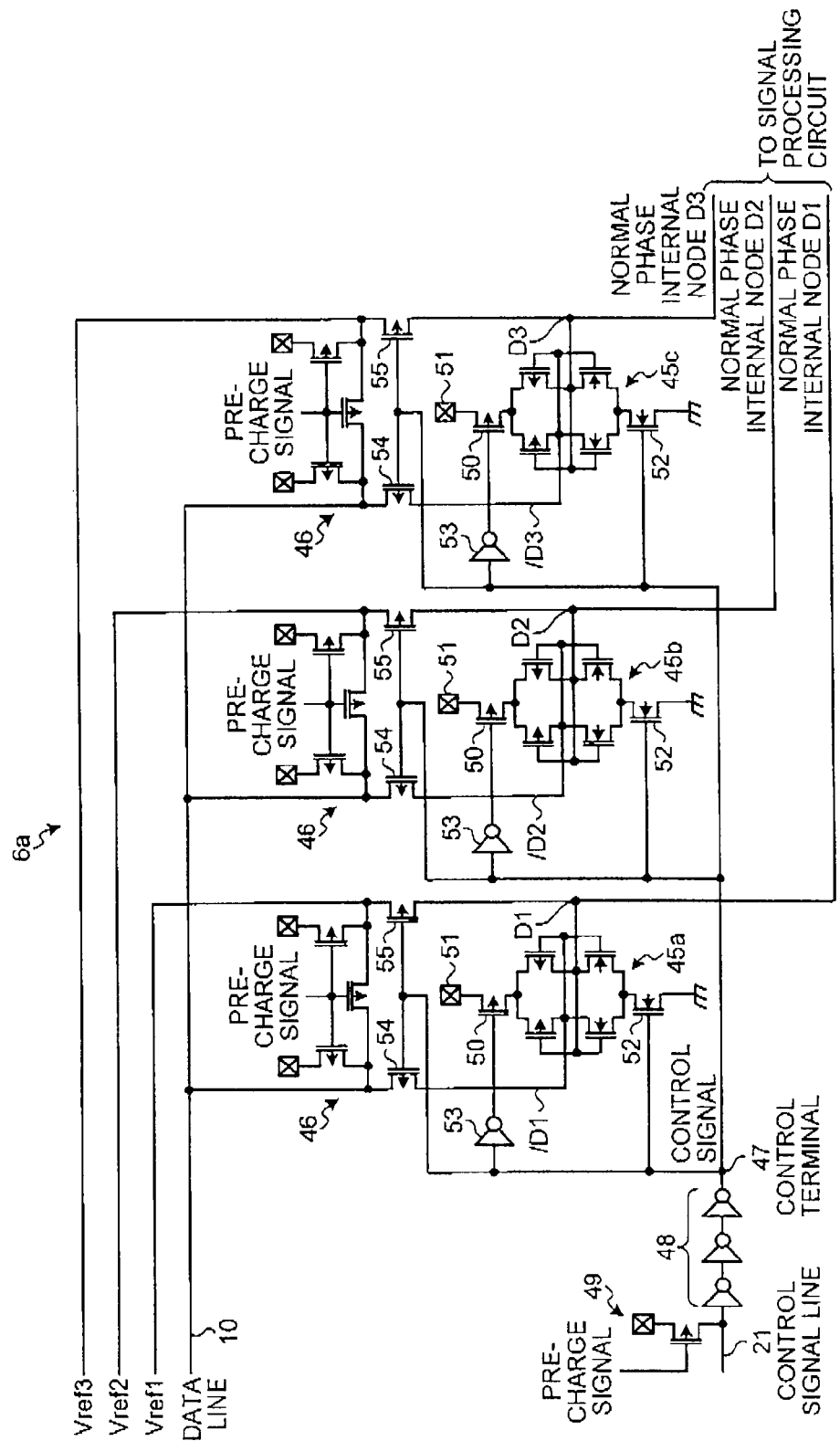
FIG. 6 is a circuit diagram showing a configuration example of an image data receiving circuit shown in FIG. 2.

FIG. 6 is a circuit diagram showing a configuration example of the image data receiving circuit 6a. As shown in FIG. 6, the image data receiving circuit 6a includes 3 differential amplifier circuits 45a, 45b, and 45c as a configuration for one data line 10. Pre-charge circuits 46 having the same configuration which pre-charge the reference voltage line Vref1, Vref2, or Vref3 and the data line 10 are respectively provided to each of the 3 differential amplifier circuits 45a, 45b, and 45c. Also, a pre-charge circuit 49 is provided to the control signal line 21 connected to a common control terminal 47 via a logic adjusting circuit 4B.

The 3 differential amplifier circuits 45a, 45b, and 45c each have a configuration in which 2 CMOS inverters are connected in parallel, an input terminal and an output terminal of the 2 CMOS inverters are connected to each other, one cross connection terminal is defined as a normal phase internal node D1, D2, or D3, and the other cross connection terminal is defined as a reverse phase internal node /D1, /D2, or /D3. The normal phase internal nodes D1, D2, and D3 are output terminals to the signal processing circuit 7. One terminal of the parallel circuit of the 2 CMOS inverters is connected to a power source 51 via a PMOS transistor 50 and the other terminal is connected to the circuit ground via an NMOS transistor 52. The common control terminal 47 is directly connected to the gate terminal of the NMOS transistor 52, connected to the gate terminal of the PMOS transistor 50 via an inverter 53, and connected to each gate terminal of PMOS transistors 54 and 55. The reverse phase internal nodes /D1, /D2, and /D3 are respectively connected to the data line as "one differential input terminal of the differential amplifier circuit" via the PMOS transistor 54. The normal phase internal nodes D1, D2, and D3 are respectively connected to the reference voltage lines Vref1, Vref2, and Vref3 as "the other differential input terminal of the differential amplifier circuit" via the PMOS transistor 55.

The pre-charge circuit 46 on the side of the differential amplifier circuit 45a is configured to pre-charge the data line and the reference voltage line Vref1 by connecting the data line and the reference voltage line Vref1 to the power source in a period when a pre-charge signal is low level. The pre-charge circuit 46 on the side of the differential amplifier circuit 45b is configured to pre-charge the data line and the reference voltage line Vref2 by connecting the data line and the reference voltage line Vref2 to the power source in a period when a pre-charge signal is low level. The pre-charge circuit 46 on the side of the differential amplifier circuit 45c is configured to pre-charge the data line and the reference voltage line Vref3 by connecting the data line and the reference voltage line Vref3 to the power source in a period when a pre-charge signal is low level. The pre-charge circuit 49 is configured to pre-charge the control signal line 21 by connecting the control signal line 21 to the power source in a period when a pre-charge signal is low level.

Figure 7:
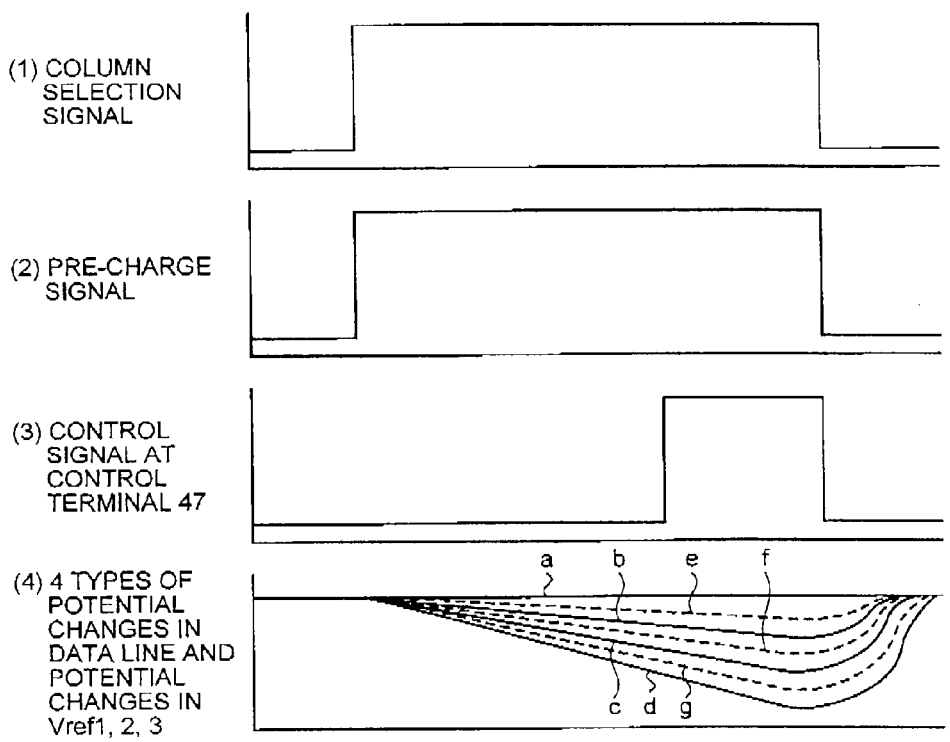
FIG. 7 is a waveform diagram for explaining potential changes in a data line and 3 reference voltage lines when transferring 2 bits of 2 columns.
Figure 8:
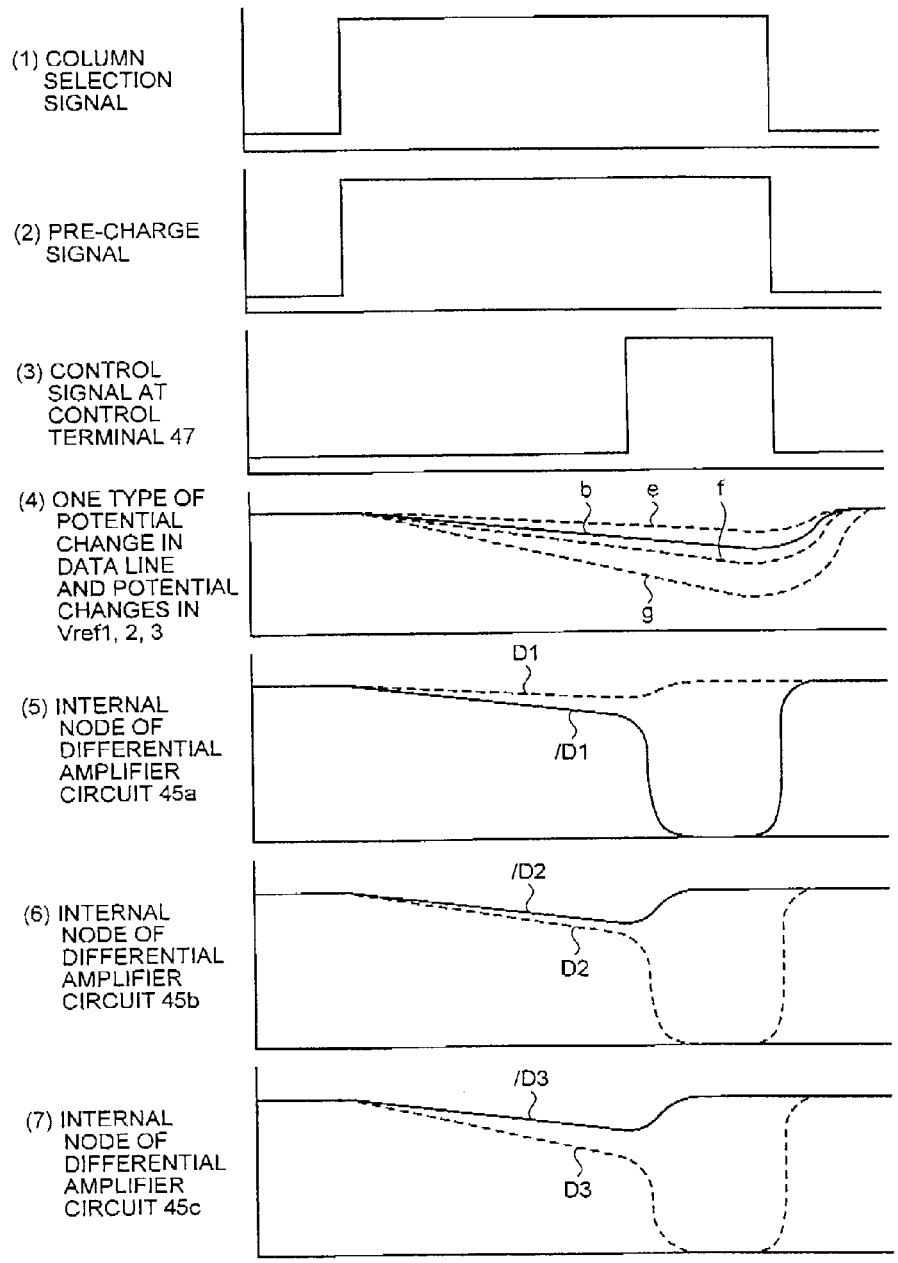
FIG. 8 is a waveform diagram for explaining potential changes in 2 nodes in each of three differential amplifier circuits that receive 2-bit data.

Next, operations will be described with reference to FIGS. 7 to 9. FIG. 7 is a waveform diagram for explaining potential changes in the data line and the 3 reference voltage lines when transferring 2 bits of 2 columns. FIG. 8 is a waveform diagram for explaining potential changes in two nodes in each of the 3 differential amplifier circuits that receive 2-bit data. FIG. 9 is a diagram for explaining an operation in which the signal processing circuit calculates transferred 2 bits of 2 columns from an output of the image data receiving circuit.

In FIG. 7, as shown in FIGS. 7 (1) and (2), in a period when the column selection signal is outputted, the pre-charge signal is high level and the pre-charge circuits 46 and 49 are turned off. However, in a time period between the periods when the column selection signal is outputted, the pre-charge signal is low level. In a period when the pre-charge signal is low level, the pre-charge circuits 46 and 49 are turned on, and the data line 10, the reference voltage lines Vref1, Vref2, and Vref3, and the control signal line 21 are respectively pre-charged to a power source potential VDD. At this time, if the control terminal 47 becomes high level, the differential amplifier circuits 45a, 45b, and 45c become active. However, the PMOS transistors 54 and 55 are turned off, so that the differential amplifier circuits 45a, 45b, and 45c are separated from the data line 10 and the reference voltage lines Vref1, Vref2, and Vref3.

In a period when the column selection signal is outputted to be high level, in the control signal drive circuit 20, the NMOS transistor 40 is turned on. Since the NMOS transistor 41 is turned on at all times, discharge of the control signal line 21 is performed. Thus the potential of the control signal line 21 decreases and the control signal appears at the control terminal 47 as shown in FIG. 7 (3) at a timing when the potential becomes lower than a threshold value of the logic adjusting circuit 48. Based on this, the differential amplifier circuits 45a, 45b, and 45c become active. At this time, the PMOS transistors 54 and 55 are turned on, so that corresponding ones of the data line 10 and the reference voltage lines Vref1, Vref2, and Vref3 are respectively connected to the normal phase internal nodes D1, D2, and D3 and the reverse phase internal nodes /D1, /D2, and /D3 in the differential amplifier circuits 45a, 45b, and 45c.

Also in the data transfer circuit 18a and the reference voltage drive circuit 19a, in a period when the column selection signal is outputted to be high level, in the same way, discharges of the data line 10 and the reference voltage lines Vref1, Vref2, and Vref3 are performed, and the potentials decrease. However, the potential changes in the data line 10 and the reference voltage lines Vref1, Vref2, and Vref3 are as shown in FIG. 7 (4) due to their circuit characteristics. In FIG. 7 (4), the solid lines indicate the potential changes in the data line 10 and the dashed lines indicate the potential changes in the reference voltage lines Vref1, Vref2, and Vref3.

The data transfer circuit 18a transfers one of 4 types of combinations (0, 0), (0, 1), (1, 0), and (1, 1) of 2 bits (Dn+1, Dn). FIG. 7 (4) shows characteristics of the potential changes a, b, c, and d of the data line 10 when the 4 types of combinations are transferred.

In the data transfer circuit 18a, when (Dn+1, Dn)=(0, 0), both NMOS transistors 28 and 26 are turned off, and the gate width W through which the data line 10 is discharged is 0 µm. when (Dn+1, Dn)=(0, 1), the NMOS transistor 28 is turned off, the NMOS transistor 26 is turned on, and the gate width W through which the data line 10 is discharged is 2 µm. When (Dn+1, Dn)=(1, 0), the NMOS transistor 28 is turned on, the NMOS transistor 26 is turned off, and the gate width W through which the data line 10 is discharged is 4 µm. When (Dn+1, Dn)=(1, 1), both NMOS transistors 28 and 26 are turned on, and the gate width W through which the data line 10 is discharged is 6 µm.

Therefore, when (Dn+1, Dn) (0, 0), the potential change in the data line 10 is indicated by the characteristics a in which the potential does not decrease, and in order of (0, 1), (1, 0), and (1, 1) of (Dn+1, Dn), the decrease of the potential increases as indicated by the characteristics b, c, and d.

FIG. 7 (4) shows the characteristics of the potential changes e, f, and g of the reference voltage lines Vref1, Vref2, and Vref3 driven by the reference voltage drive circuit 19a. In the reference voltage drive circuit 19a, in a period when the column selection signal is outputted to be high level, the NMOS transistor 30 that drives the reference voltage line Vref1, the NMOS transistor 33 that drives the reference voltage line Vref2, and the NMOS transistor 35 that drives the reference voltage line Vref3 are all turned on. The NMOS transistors 31, 34, and 36 are turned on at all times. Therefore, the gate width W through which the reference voltage line Vref1 is discharged is 1 µm, the gate width W through which the reference voltage line Vref2 is discharged is 3 µm, and the gate width W through which the reference voltage line Vref3 is discharged is 5 µm.

Therefore, the decreasing speed of the potential of the reference voltage line Vref1 is an intermediate speed between the characteristics a when the transferred 2 bits are (0, 0) and the characteristics b when the transferred 2 bits are (0, 1), so that the potential change in the reference voltage line Vref1 is as shown by the characteristics e. The decreasing speed of the potential of the reference voltage line Vref2 is an intermediate speed between the characteristics b when the transferred 2 bits are (0, 1) and the characteristics c when the transferred 2 bits are (1, 0), so that the potential change in the reference voltage line Vref2 is as shown by the characteristics f. Similarly, the decreasing speed of the potential of the reference voltage line Vref3 is an intermediate speed between the characteristics c when the transferred 2 bits are (1, 0) and the characteristics d when the transferred 2 bits are (1, 1), so that the potential change in the reference voltage line Vref3 is as shown by the characteristics g.

In this way, the potentials of the reference voltage lines Vref1, Vref2, and Vref3 driven by the reference voltage drive circuit 19a are intermediate potentials among the potentials of the data line 10 corresponding to the 4 types of bit patterns of the transferred 2 bits.

Next, in FIG. 8, FIGS. 8 (1), (2), and (3) are the same as FIGS. 7 (1), (2), and (3). FIG. 8 (4) shows the characteristics of the potential change b of the data line 10 shown in FIG. 7 (4) when the transferred 2 bits are (0, 1) and the characteristics e, f, and g of the reference voltage lines Vref1, Vref2, and Vref3 as a case in which the data transfer circuit 18a transfers one of the 4 types of combinations (0, 0), (0, 1), (1, 0), and (1, 1) of the 2 bits (Dn+1, Dn).

FIG. 8 (5) shows potential changes in the internal nodes (D1, /D1) of the differential amplifier circuit 45a to which the data line 10 and the reference voltage line Vref1 are connected. The dashed line indicates the potential change in the normal phase internal node D1 to which the reference voltage line Vref1 is connected and the solid line indicates the potential change in the reverse phase internal node /D1 to which the data line 10 is connected.

FIG. 8 (6) shows potential changes in the internal nodes (D2, /D2) of the differential amplifier circuit 45b to which the data line 10 and the reference voltage line Vref2 are connected. The dashed line indicates the potential change in the normal phase internal node D2 to which the reference voltage line Vref2 is connected and the solid line indicates the potential change in the reverse phase internal node /D2 to which the data line 10 is connected.

FIG. 8 (7) shows potential changes in the internal nodes (D3, /D3) of the differential amplifier circuit 45c to which the data line 10 and the reference voltage line Vref3 are connected. The dashed line indicates the potential change in the normal phase internal node D3 to which the reference voltage line Vref3 is connected and the solid line indicates the potential change in the reverse phase internal node /D3 to which the data line 10 is connected.

The logic levels of the normal phase internal nodes D1, D2, and D3 shown in FIGS. 8 (5), (6), and (7) are D1=1, D2=0, and D3=0. When showing the logic levels of the normal phase internal nodes D1, D2, and D3 in association with the 4 types of combinations (1, 1), (1, 0), (0, 1), and (0, 0) of the transferred 2 bits (Dn+1, Dn), the logic levels of the normal phase internal nodes D1, D2, and D3 are as shown in FIG. 9. That is to say, the signal processing circuit 7 can identify one of the 4 types of combinations (1, 1), (1, 0), (0, 1), and (0, 0) of the transferred 2 bits (Dn+1, Dn) by acquiring the logic levels of the normal phase internal nodes D1, D2, and D3 of the differential amplifier circuits 45a, 45b, and 45c.

Here, the wiring of the data line 10 goes across the sample hold signal conversion circuit group 4a, so that the characteristics of the potential change in the data line 10 are affected by parasitic resistance and parasitic capacitance of the wiring. However, the data line 10, the reference voltage lines Vref1, Vref2, and Vref3, and the control signal line 21 are configured to be controlled by circuits present in the same column. Therefore, relative potential differences between the data line 10 and the reference voltage lines Vref1, Vref2, and Vref3, and a timing when the differential amplifier circuits 45a, 45b, and 45c are activated are difficult to be affected by the parasitic resistance and the parasitic capacitance of the wiring. Therefore, the signal processing circuit 7 can read the transferred 2 bits (Dn+1, Dn) from the outputs of the normal phase internal nodes D1, D2, and D3 of the differential amplifier circuits 45a, 45b, and 45c with less errors.

As described above, according to the first embodiment, 2 bits can be transferred at the same time for each 2 columns in the pixel array 2, so that the number of transfer times can be halved and the transfer time can be reduced.

Second Embodiment

Figure 10:
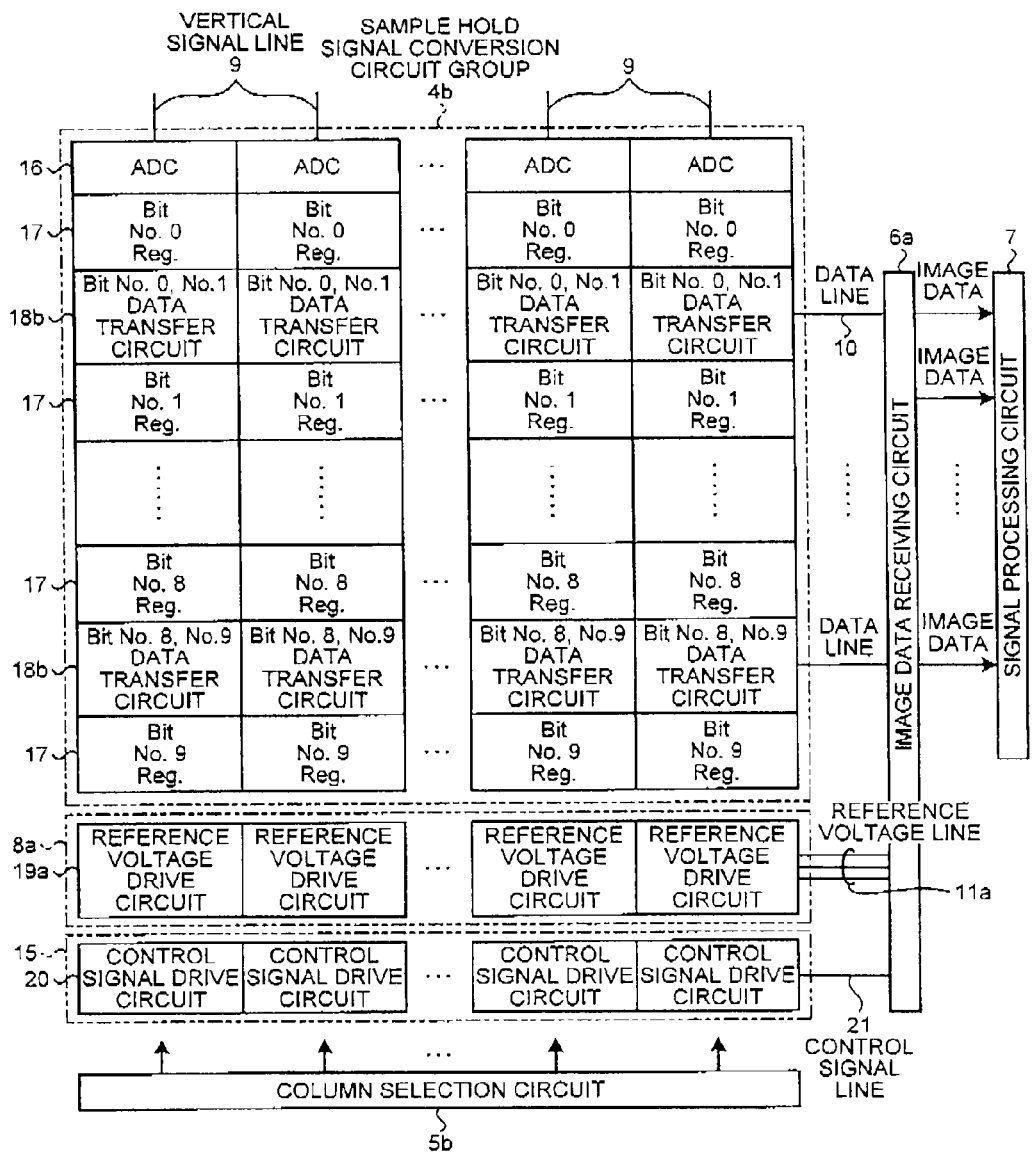
FIG. 10 is a block diagram showing a main configuration of a solid-state imaging device according to a second embodiment.

FIG. 10 is a block diagram showing a main configuration of a solid-state imaging device according to a second embodiment. In the second embodiment, a configuration example of a case in which the number of bits n transferred by each data transfer circuit is 2, and 2 bits in the same column are transferred will be described.

In FIG. 10, in the configuration shown in FIG. 2 (the first embodiment), a sample hold signal conversion circuit group 4b is provided instead of the sample hold signal conversion circuit group 4a, and a column selection circuit 5b is provided instead of the column selection circuit 5a. The other components are the same and the same reference characters are given to the components. Here, portions related to the second embodiment will be mainly described.

In the second embodiment, the column selection circuit 5b repeatedly outputs a column selection signal which sequentially selects each column in the pixel array 2 at a predetermined time interval. In other words, the column selection circuit 5b is the same as the column selection circuit in the general configuration. In the same manner as in the first embodiment, each column selection signal is inputted into the sample hold signal conversion circuit group 4b, the reference voltage drive circuit group 8a, and the control signal drive circuit group 15.

In the sample hold signal conversion circuit group 4b, a data transfer circuit 18b is arranged for each two 1-bit register circuits arranged in the column direction in each column, so that 5 data transfer circuits (Bit No. 0, No. 1 data transfer circuit to Bit No. 8, No. 9 data transfer circuit) 18b in which data held by the two 1-bit register circuits are inputted are arranged in the column direction. Therefore, the number of data line 10 connected to the image data receiving circuit 6a is 5. A configuration of each data line 10 in the image data receiving circuit 6a is as shown in FIG. 6.

The reference voltage drive circuit group 8a includes a plurality of (in this example, N) reference voltage drive circuits 19a arranged in a one-to-one relationship with the data transfer circuits 18b for each column. By the configuration shown in FIG. 4, each reference voltage drive circuit 19a drives in parallel the 3 reference voltage lines (Vref1, Vref2, and Vref3) 11a connected to the image data receiving circuit 6a in accordance with the column selection signal from the column selection circuit 5b, and causes potential changes of characteristics e, f, and g shown in FIG. 7 (4).

The control signal drive circuit group 15 includes a plurality of (in this example, N) control signal drive circuits 20 arranged in a one-to-one relationship with the data transfer circuits 18b for each column. By the configuration shown in FIG. 5, each control signal drive circuit 20 drives in parallel the one control signal line 21 connected to the image data receiving circuit 6a in accordance with the column selection signal from the column selection circuit 5b, and outputs the control signal (FIG. 7 (3)) to the control terminal 47 in the image data receiving circuit 6a.

Figure 11:
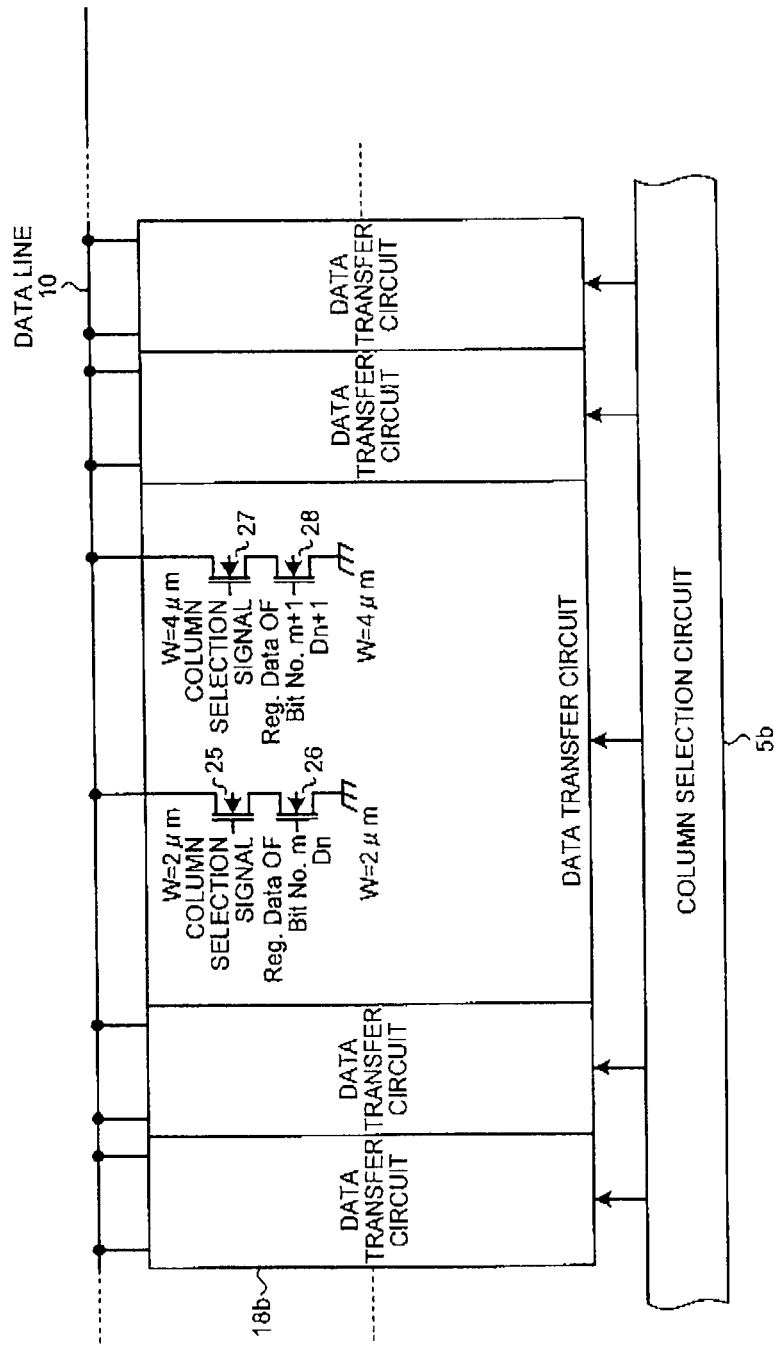
FIG. 11 is a circuit diagram showing a configuration example of a data transfer circuit shown in FIG. 10.

FIG. 11 is a circuit diagram showing a configuration example of the data transfer circuit 18b. As shown in FIG. 11, the data transfer circuit 18b has the same configuration as that of the data transfer circuit 18a shown in FIG. 3, and a point different from the data transfer circuit 18a is only that the 2 bits to be handled is 2 bits in the column direction. Specifically, in the same manner as in the data transfer circuit 18a, the column selection signal is inputted into each gate terminal of the 2 NMOS transistors 25 and 27 on the side of the data line 10. On the other hand, in the 2 NMOS transistors 26 and 28 on the side of the circuit ground, data Dn held by a 1-bit register circuit having mth bit is inputted into the gate terminal of the NMOS transistor 26 and data Dn+1 held by a 1-bit register circuit having (m+1)th bit is inputted into the gate terminal of the NMOS transistor 28.

In other words, the data transfer circuit 18b can drive the data line 10 by completely the same gate widths W as those of the data transfer circuit 18a for the 4 types of combinations (0, 0), (0, 1), (1, 0), and (1, 1) of the 2 bits (Dn+1, Dn) next to each other in the column direction, so that the data transfer circuit 18b causes the potential changes of the characteristics a, b, c, and d shown in FIG. 7 (4).

Therefore, since the 2 internal nodes of each of the 3 differential amplifier circuits 45a, 45b, and 45c in the image data receiving circuit 6a have a complementary potential relationship as shown in FIGS. 8 (5), (6), and (7), in the same manner as in FIG. 9, the 4 types of combinations (0, 0), (0, 1), (1, 0), and (1, 1) of the 2 bits (Dn+1, Dn) next to each other in the column direction can be identified by the combination of the potentials (logic levels) of the normal phase internal nodes D3, D2, and D1.

As described above, according to the second embodiment, 2 bits in the column direction share one data transfer circuit, so that the number of data transfer circuits per column can be halved and the circuit scale of the sample hold signal conversion circuit group can be reduced. In addition, the number of data lines decreases, so that the image data receiving circuit can be simplified.

Third Embodiment

Figure 12:
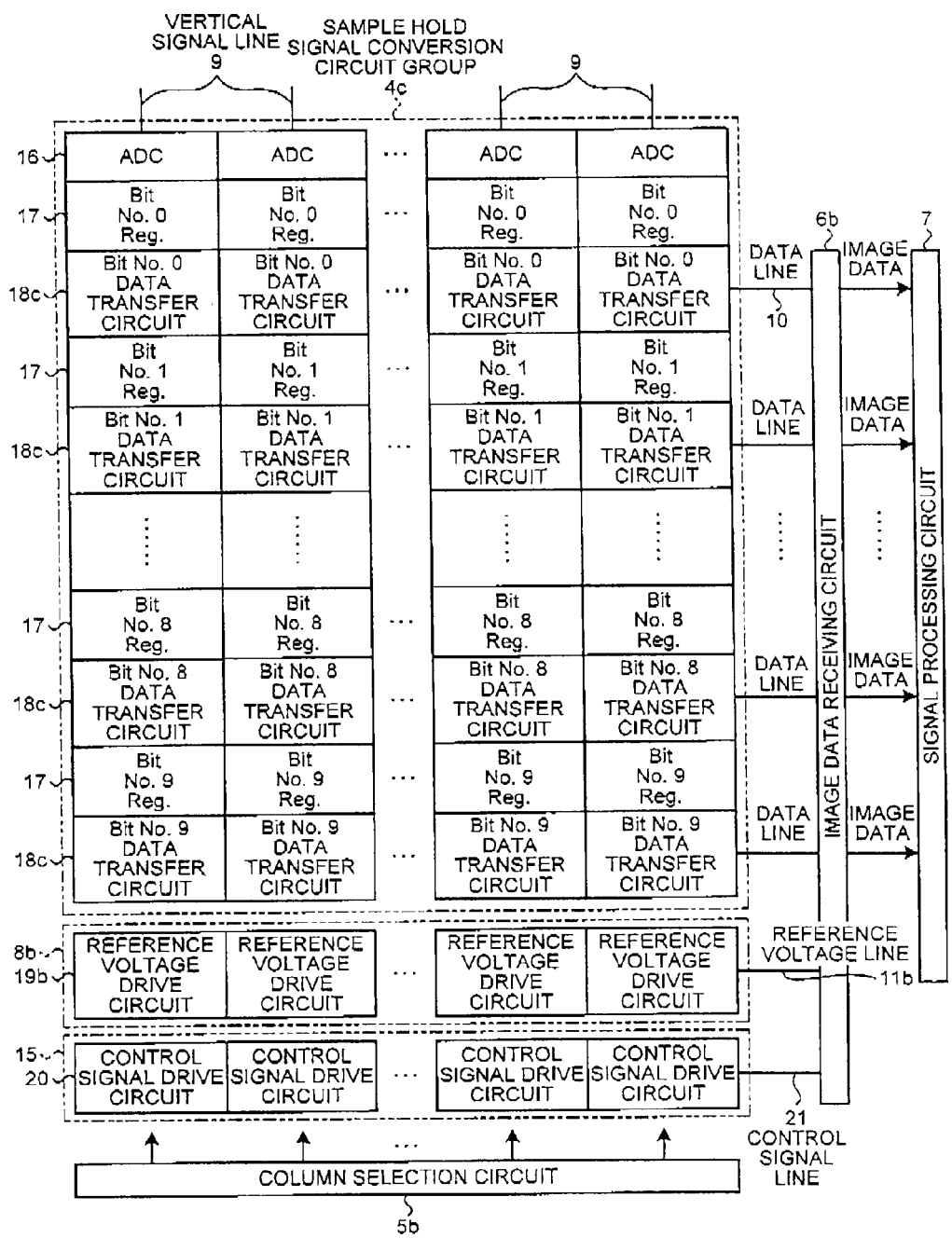
FIG. 12 is a block diagram showing a main configuration of a solid-state imaging device according to a third embodiment.

FIG. 12 is a block diagram showing a main configuration of a solid-state imaging device according to a third embodiment. In the third embodiment, a configuration example of a case in which a 1-bit transfer is performed in the same manner as in the general configuration will be described. As shown in FIG. 12, in the configuration shown in FIG. 10 (the second embodiment), reference characters of the components are changed except for those of the column selection circuit 5b, the control signal drive circuit group 15, and the signal processing circuit 7.

Figure 13:
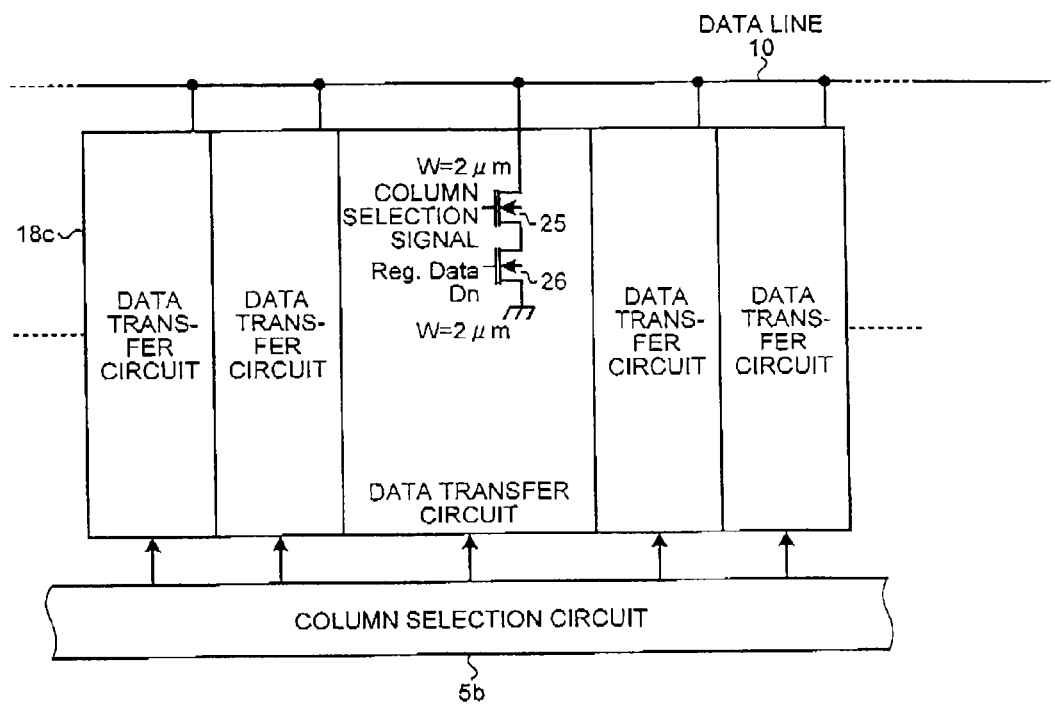
FIG. 13 is a circuit diagram showing a configuration example of a data transfer circuit shown in FIG. 12.

In FIG. 12, in a sample hold signal conversion circuit group 4c, a data transfer circuit 18c that performs a 1-bit transfer is provided for each 1-bit register circuit 17 in the column direction. Therefore, the number of the data line 10 is 10. For example, N data transfer circuits, 18c arranged in the row direction are respectively configured as shown in FIG. 13, and drive one data line 10 in parallel in accordance with the column selection signal from the column selection circuit 5b.

A reference voltage drive circuit group 8b includes N reference voltage drive circuits 19b arranged in the row direction in a one-to-one relationship with the data transfer circuits 18c in each column. For example, each reference voltage drive circuit 19b is respectively configured as shown in FIG. 14, and drives one reference voltage line 11b in parallel in accordance with the column selection signal from the column selection circuit 5b.

Figure 15:
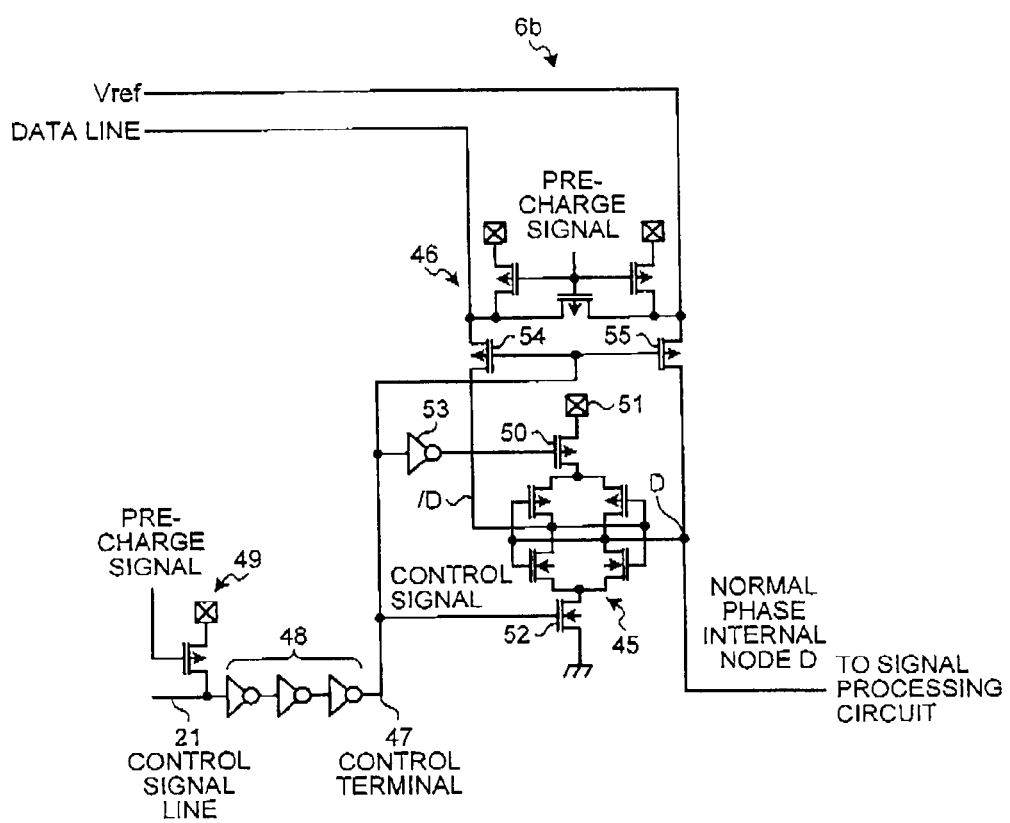
FIG. 15 is a circuit diagram showing a configuration example of an image data receiving circuit shown in FIG. 12.

Since an image data receiving circuit 6b performs a 1-bit transfer, for example, as shown in FIG. 15, the image data receiving circuit 6b includes one differential amplifier circuit for each data line 10. Each differential amplifier circuit generates a binary value of 1 bit corresponding to potential changes in one data line 10 and one reference voltage line Vref at the internal node in a distinguishable manner and outputs the binary value to the signal processing circuit 7.

Next, configurations of each component will be described. In FIG. 13, each data transfer circuit 18b has the same configuration and includes 2 NMOS transistors 25 and 26 connected in series between the data line 10 and the circuit ground. The column selection signal from the column selection circuit 5a is inputted into the gate terminal of the NMOS transistor 25 on the side of the data line 10. 1-bit data Reg. Data Dn held by the register circuit 17 in the nth column is inputted into the gate terminal of the NMOS transistor 26 on the side of the circuit ground. The gate width W of the 2 NMOS transistors 25 and 26 connected in series is the same and equal to 2 μm.

Figure 14:
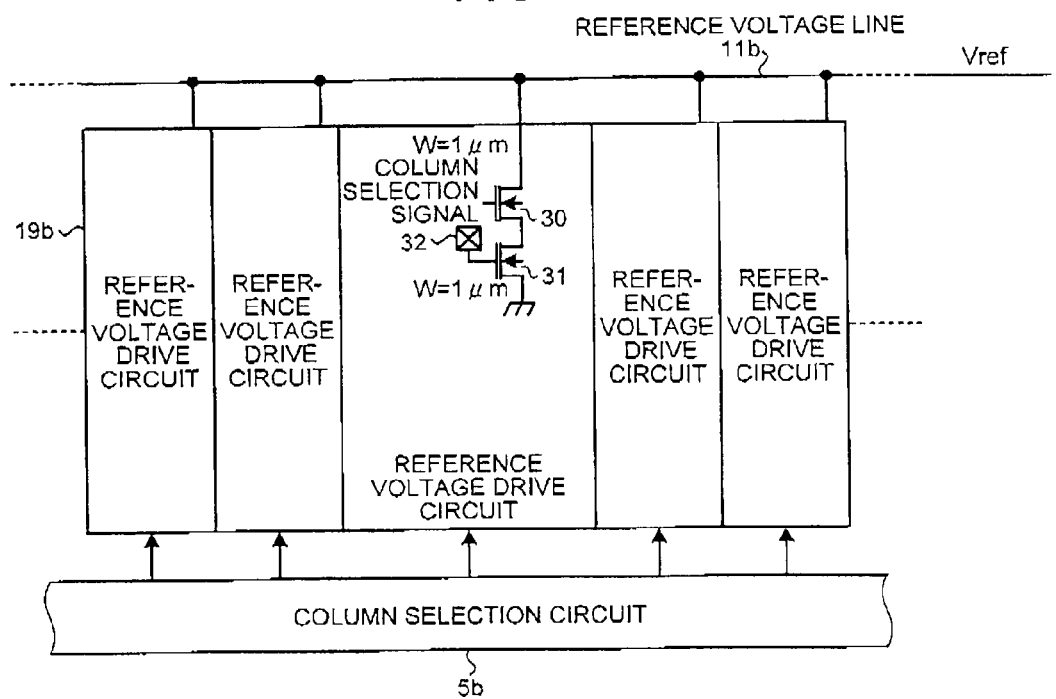
FIG. 14 is a circuit diagram showing a configuration example of a reference voltage drive circuit shown in FIG. 12.

In FIG. 14, each reference voltage drive circuit 19b has the same configuration and includes 2 NMOS transistors 30 and 31 connected in series between the reference voltage line Vref which is the one reference voltage line 11a and the circuit ground. The column selection signal from the column selection circuit 5a is inputted into the gate terminal of the NMOS transistor 30 on the side of the reference voltage line Vref. The power source 32 is connected to the gate terminal of the NMOS transistor 31 on the side of the circuit ground. The gate width W of the 2 NMOS transistors 30 and 31 connected in series is the same and equal to 1 μm.

As shown in FIG. 15, the image data receiving circuit 6b includes one differential amplifier circuit 45 as a configuration for one data line 10. A pre-charge circuit 46 which pre-charges the reference voltage line Vref and the data line 10 is provided, and a pre-charge circuit 49 is provided to the control signal line 21 connected to the control terminal 47 via the logic adjusting circuit 48.

The differential amplifier circuit 45 has a configuration in which 2 CMOS inverters are connected in parallel, an input terminal and an output terminal of the 2 CMOS inverters are connected to each other, one cross connection terminal is defined as a normal phase internal node D, and the other cross connection terminal is defined as a reverse phase internal node /D. The normal phase internal node D is an output terminal to the signal processing circuit 7. One terminal of the parallel circuit of the 2 CMOS inverters is connected to the power source 51 via the PMOS transistor 50 and the other terminal is connected to the circuit ground via the NMOS transistor 52. The control terminal 47 is directly connected to the gate terminal of the NMOS transistor 52, connected to the gate terminal of the NMOS transistor 50 via an inverter 53, and connected to each gate terminal of the PMOS transistors 54 and 55. The reverse phase internal node /D is connected to the data line as "one differential input terminal of the differential amplifier circuit" via the PMOS transistor 54. The normal phase internal node D is connected to the reference voltage line Vref as "the other differential input terminal of the differential amplifier circuit" via the PMOS transistor 55.

Figure 16:
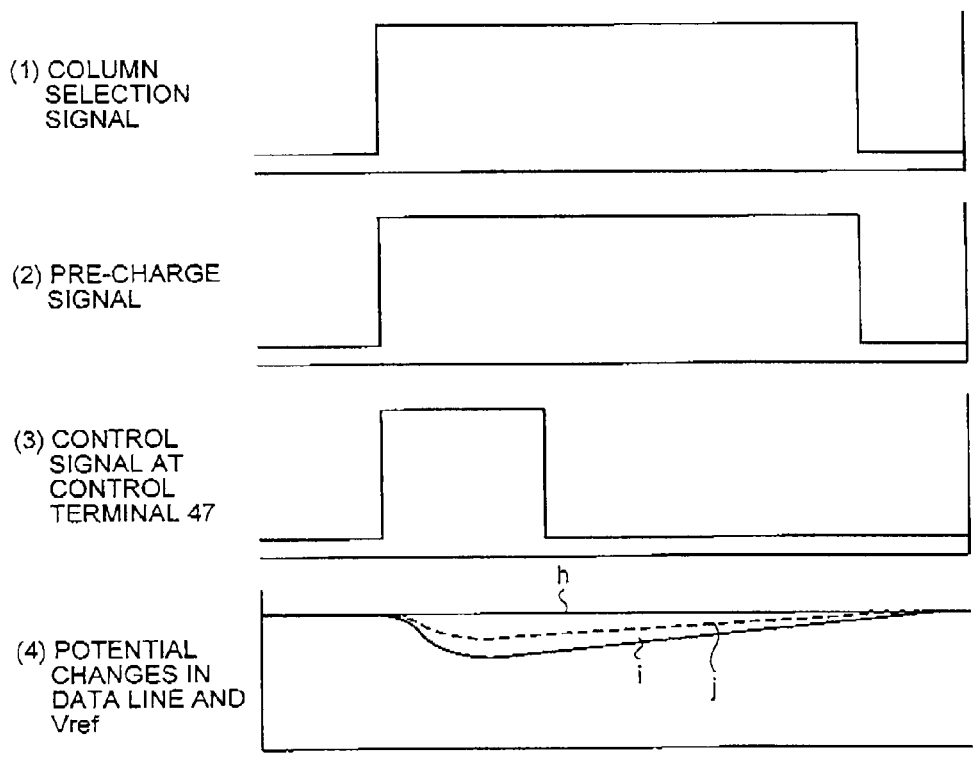
FIG. 16 is a waveform diagram for explaining potential changes in a data line and a reference voltage line when transferring 1 bit.
Figure 17:
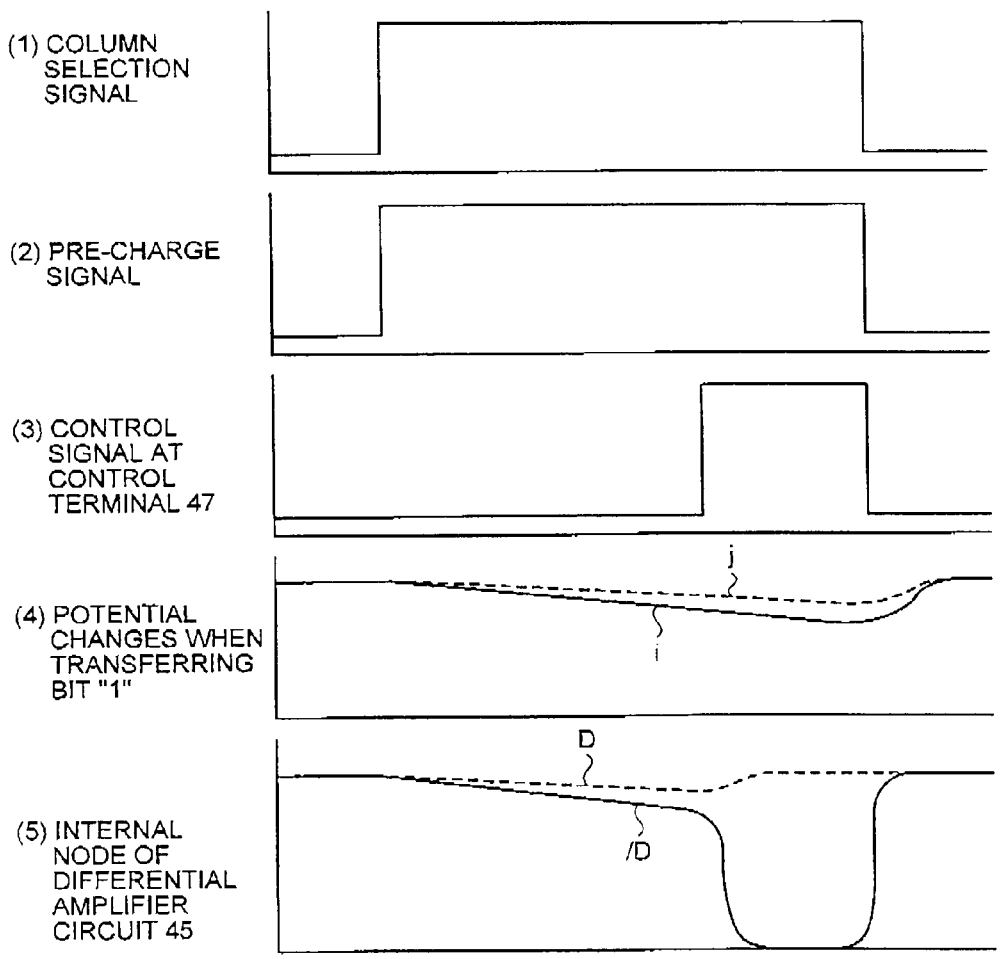
FIG. 17 is a waveform diagram for explaining potential changes in an internal node of a differential amplifier circuit when transferring a bit "1"
Figure 18:
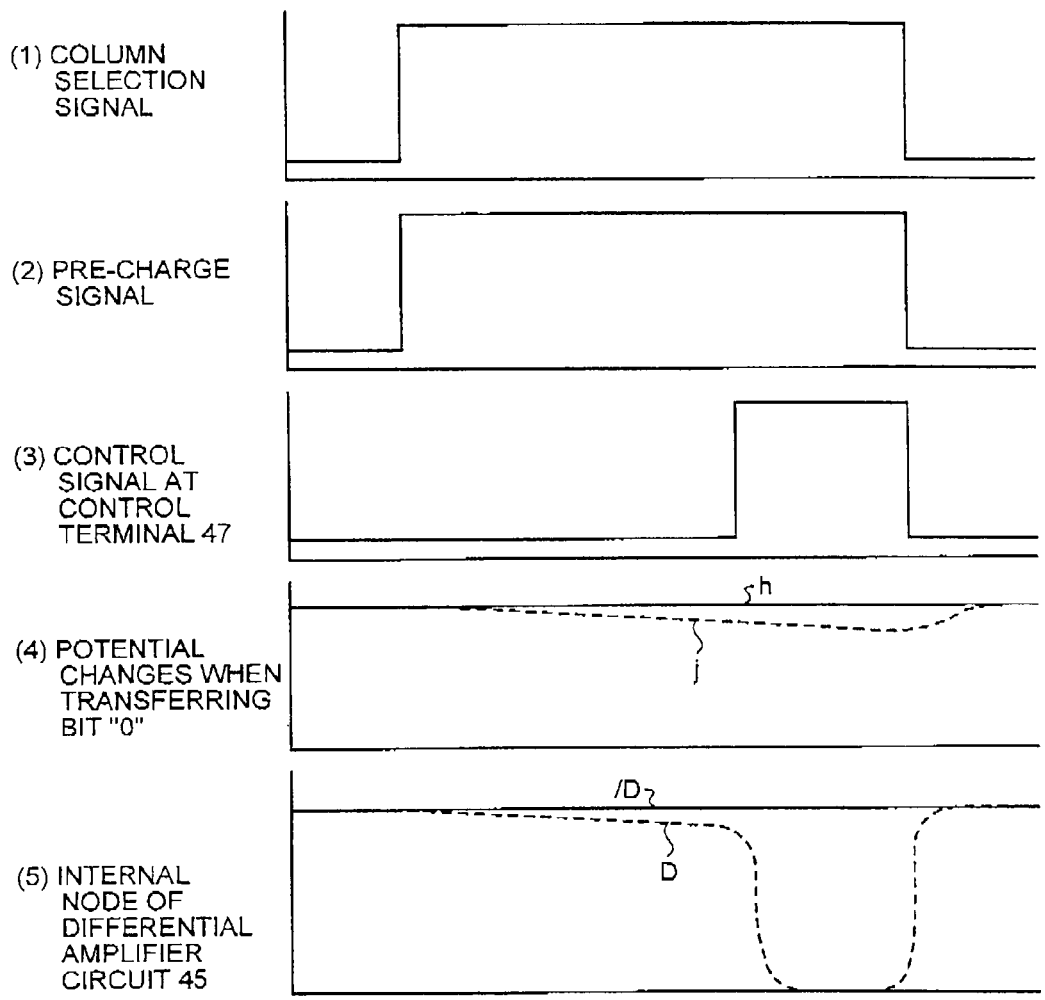
FIG. 18 is a waveform diagram for explaining potential changes in an internal node of a differential amplifier circuit when transferring a bit "0"

Next, operations will be described with reference to FIGS. 16 to 18. FIG. 16 is a waveform diagram for explaining potential changes in the data line and the reference voltage line when transferring 1 bit. FIG. 17 is a waveform diagram for explaining potential changes in the internal node of the differential amplifier circuit when transferring a bit "1". FIG. 18 is a waveform diagram for explaining potential changes in the internal node of the differential amplifier circuit when transferring a bit "0".

In FIG. 16, FIGS. 16 (1), (2), and (3) indicate the same contents as those of FIGS. 7 (1), (2), and (3). Here, FIG. 16 (4) will be described. In FIG. 16 (4), the solid lines indicate the potential changes in the data line 10 and the dashed line indicates the potential change in the reference voltage line Vref. The data transfer circuit 18c transfers one of 2 values "0" and "1" of 1 bit. FIG. 16 (4) shows characteristics of the potential changes h and i of the data line 10 when the 2 values "0" and "1" are transferred.

In the data transfer circuit 18c, when a corresponding 1-bit register circuit 17 holds a bit "0", the NMOS transistor 26 is turned off, and the gate width W through which the data line 10 is discharged is 0 so that the potential of the data line 10 is indicated by the characteristics h that does not change. In the data transfer circuit 18c, when a corresponding 1-bit register circuit 17 holds a bit "1", the NMOS transistor 26 is turned on, and the gate width W through which the data line 10 is discharged is 2 so that the potential of the data line 10 is indicated by the characteristics i in which the potential decreases.

On the other hand, in the reference voltage drive circuit 19b, in a period when the column selection signal is outputted to be high level, the NMOS transistor 30 that drives the reference voltage line Vref is turned on. The NMOS transistor 31 is turned on at all times. Therefore, the gate width w through which the reference voltage line Vref is discharged is 1 μm.

As a result, the decreasing speed of the potential of the reference voltage line Vref is an intermediate speed between the characteristics h when the transferred 1 bit is "1" and the characteristics i when the transferred 1 bit is "1", so that the potential change in the reference voltage line Vref is as shown by the characteristics j. In this way, the potential of the reference voltage line Vref driven by the reference voltage drive circuit 19b is an intermediate potential between the potentials of the data line 10 corresponding to the 2 values of the transferred 1 bit.

Next, in FIG. 17, FIGS. 17 (1), (2), and (3) indicate the same contents as those of FIGS. 16 (1), (2), and (3). Here, FIGS. 17 (4) and (5) will be described. FIG. 17 (4) shows the change characteristics i of the data line 10 and the change characteristics j of the reference voltage line Vref when the bit "1" is transferred.

In this case, the potential changes in the internal nodes (D, /D) of the differential amplifier circuit 45 to which the data line 10 and the reference voltage line Vref are connected are as shown in FIG. 17 (5), and the potential of the normal phase internal node D indicates the logic level of bit "1".

Next, in FIG. 18, FIGS. 18 (1), (2), and (3) indicate the same contents as those of FIGS. 16 (1), (2), (3). Here, FIGS. 18 (4) and (5) will be described. FIG. 18 (4) shows the change characteristics h of the data line 10 and the change characteristics j of the reference voltage line Vref when the bit "0" is transferred.

In this case, the potential changes in the internal nodes (D, /D) of the differential amplifier circuit 45 to which the data line 10 and the reference voltage line Vref are connected are as shown in FIG. 18 (5), and the potential of the normal phase internal node D indicates the logic level of bit "0".

Here, the wiring of the data line 10 goes across the sample hold signal conversion circuit group 4b, so that the characteristics of the potential change in the data line 10 are affected by parasitic resistance and parasitic capacitance of the wiring. However, the data line 10, the reference voltage line Vref, and the control signal line 21 are configured to be controlled by circuits present in the same column. Therefore, a relative potential difference between the data line 10 and the reference voltage line Vref, and a timing when the differential amplifier circuits 45 is activated are difficult to be affected by the parasitic resistance and the parasitic capacitance of the wiring. Therefore, the signal processing circuit 7 can read the two values of the transferred 1 bit from the output of the normal phase internal node D of the differential amplifier circuit 45 with less errors.

As described above, according to the third embodiment, when a 1-bit transfer is performed in the same manner as in the general configuration, although the number of the data transfer circuits in the column direction does not change, each data transfer circuit is configured to drive a data line of a single line instead of individually driving a twisted pair line as in the general configuration, so that the circuit scale of the data transfer circuit can be reduced. In addition, the total number of wirings is 13, which includes a data line of 10 single lines, 1 reference voltage line, and 1 control signal line.

Thus the number of wirings is smaller than that of the general configuration by 7, so that the wirings can be simplified.

Fourth Embodiment

Figure 19:
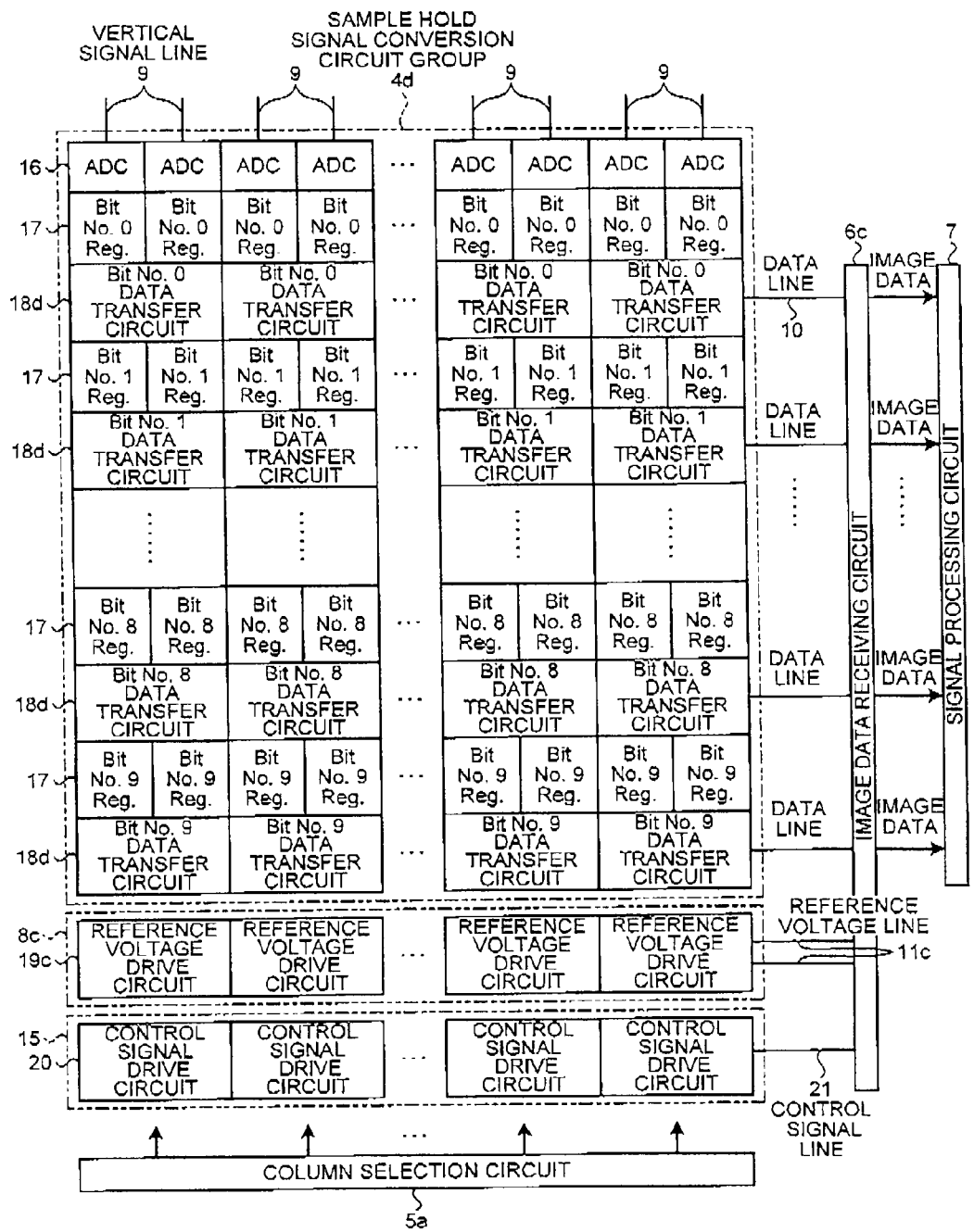
FIG. 19 is a block diagram showing a main configuration of a solid-state imaging device according to a fourth embodiment.

FIG. 19 is a block diagram showing a main configuration of a solid-state imaging device according to a fourth embodiment. In the fourth embodiment, another configuration example of a case in which the number of bits n transferred by each data transfer circuit is 2, and 2 bits are transferred for every 2 columns will be described. As shown in FIG. 19, in the configuration shown in FIG. 2 (the first embodiment), reference characters of the components are changed except for those of the column selection circuit 5a, the control signal drive circuit group 15, and the signal processing circuit 7.

Figure 20:
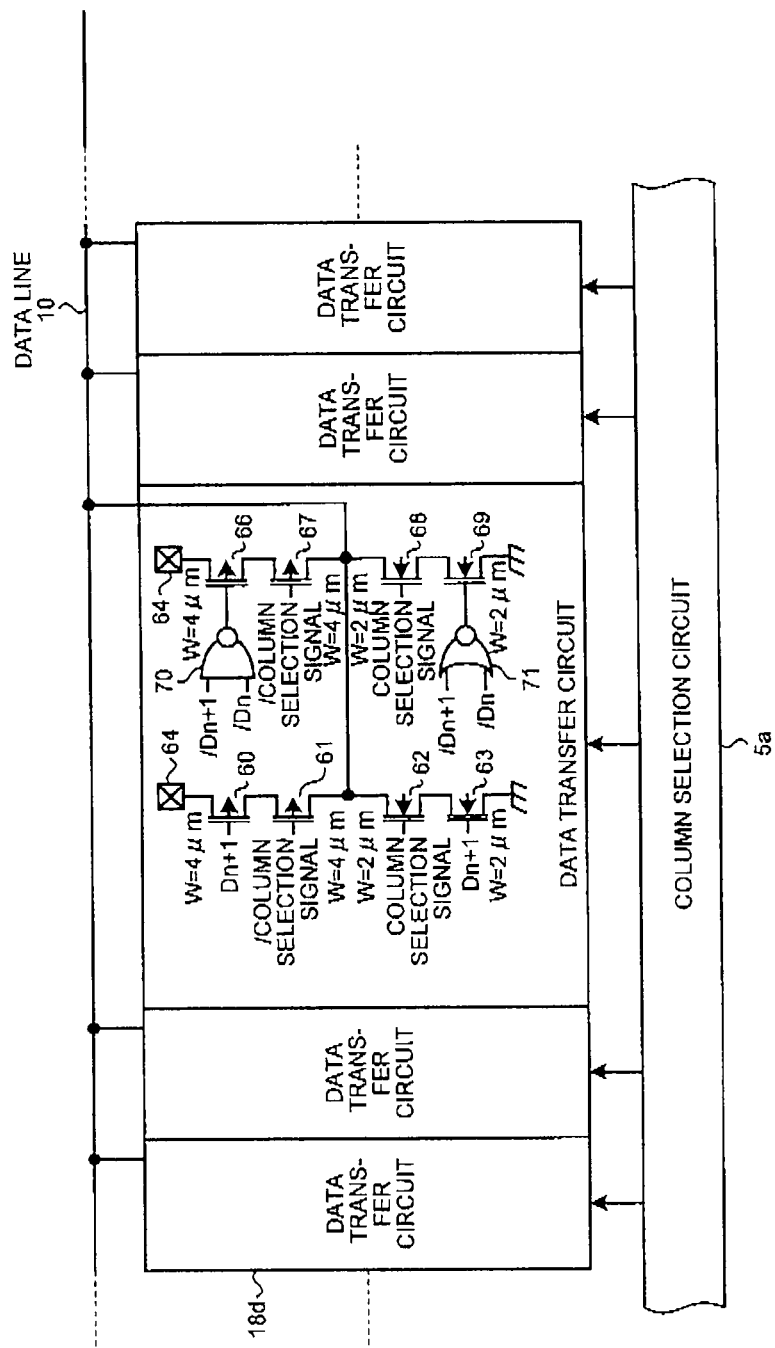
FIG. 20 is a circuit diagram showing a configuration example of a data transfer circuit shown in FIG. 19.
Figure 21:
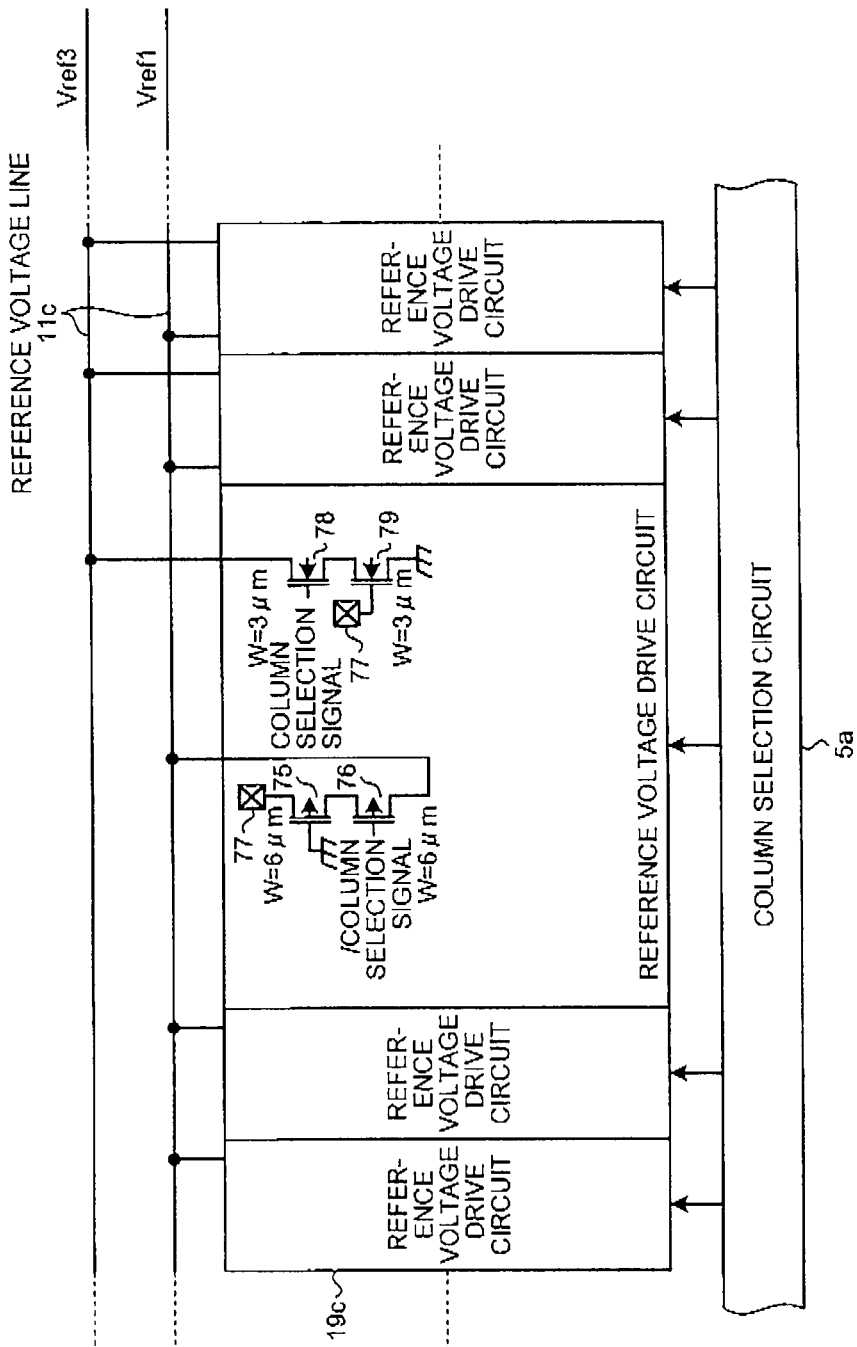
FIG. 21 is a circuit diagram showing a configuration example of a reference voltage drive circuit shown in FIG. 19.

In a sample hold signal conversion circuit group 4d, each data transfer circuit 18d that transfers 2 bits of 2 columns is configured, for example, as shown in FIG. 20. In a reference voltage drive circuit group 8c, each reference voltage drive circuit 19c is configured, for example, as shown in FIG. 21, and drives two reference voltage lines 11c in parallel.

Figure 22:
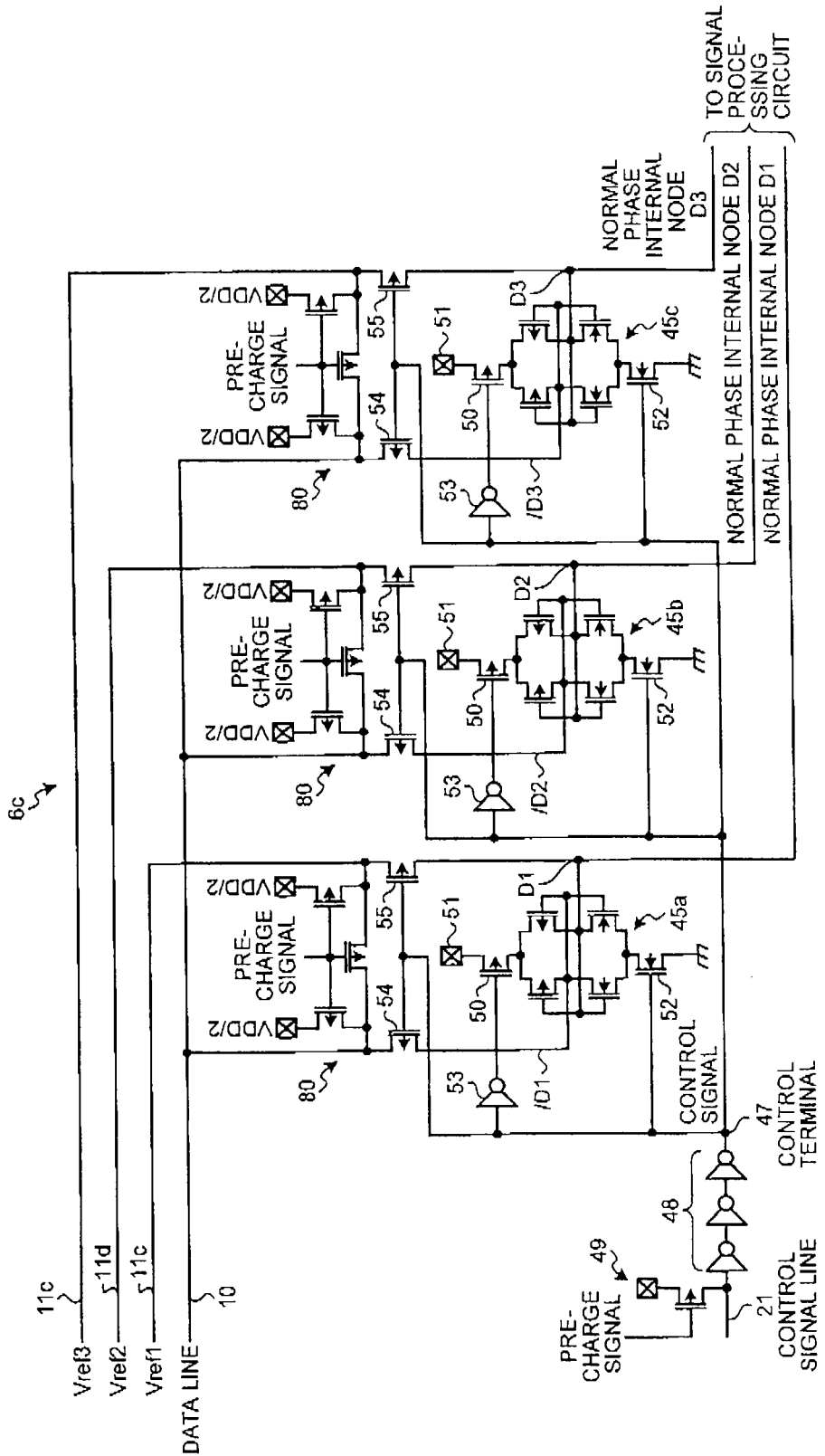
FIG. 22 is a circuit diagram showing a configuration example of an image data receiving circuit shown in FIG. 19.

An image data receiving circuit 6c is configured, for example, as shown in FIG. 22. FIG. 22 shows that the reference voltage lines Vref1, Vref2, and Vref3 shown in FIG. 6 are formed by 3 lines in which the reference voltage line Vref2 that is an internally wired reference voltage line 11d is added to the reference voltage lines Vref1 and Vref3 that are 2 reference voltage lines 11c driven by each reference voltage drive circuit 19c. A fixed voltage (VDD/2) is applied to the reference voltage line Vref2.

In FIG. 20, the data transfer circuit 18d includes PMOS transistors 60, 61 and NMOS transistors 62, 63 connected in series between a power source 64 and the circuit ground, as well as PMOS transistors 66, 67 and NMOS transistors 68, 69 connected in series between the power source 64 and the circuit ground. The in-series connection terminals of the PMOS transistor 61 and the NMOS transistor 62 and the in-series connection terminals of the PMOS transistor 67 and the NMOS transistor 68 are commonly connected to the data line 10.

The gate width W of the PMOS transistors 60, 61 and the PMOS transistors 66, 67 arranged in series on the side of the power source is 4 µm. The gate width W of the NMOS transistors 62, 63 and the NMOS transistors 68, 69 arranged in series on the side of the circuit ground is 2 µm.

In the PMOS transistors 60, 61 and the PMOS transistors 66, 67 arranged in series on the side of the power source, in the PMOS transistors 60, 66 whose source terminals are connected to the power source 64, the register data Dn+1 of the (n+1)th column is directly inputted into the gate terminal of the PMOS transistor 60, and data (/Dn+1) obtained by logically inverting the register data Dn+1 of the (n+1)th column and data (/Dn) obtained by logically inverting the register data Dn of the nth column are inputted into the gate terminal of the PMOS transistor 66 via a NAND circuit 70. A logically inverted column selection signal (/column selection signal) is inputted into each gate terminal of the PMOS transistors 61, 67 whose source terminals are connected to the drain terminals of the PMOS transistors 60, 66.

In the NMOS transistors 62, 63 and the NMOS transistors 68, 69 arranged in series on the side of the circuit ground, the column selection signal is inputted into each gate terminal of the NMOS transistors 62, 68 whose drain terminals are connected to the drain terminals of the PMOS transistors 61, 61. In the NMOS transistors 63, 69 lying between the source terminals of the NMOS transistors 62, 68 and the circuit ground, the register data Dn+1 of the (n+1)th column is directly inputted into the gate terminal of the NMOS transistors 63, and data (/Dn+1) obtained by logically inverting the register data Dn+1 of the (n+1)th column and data (/Dn) obtained by logically inverting the register data Dn of the nth column are inputted into the gate terminal of the NMOS transistors 69 via a NOR circuit 71. When the number of the columns in the pixel array 2 is N, n is an odd value such as n=1, 3, 5, . . . N−3, and N−1.

In FIG. 21, a reference voltage drive circuit group 8d includes PMOS transistors 75, 76 connected in series between the reference voltage line Vref1 and a power source 77 to drive the reference voltage line Vref1 and NMOS transistors 78, 79 connected in series between the reference voltage line Vref3 and the circuit ground to drive the reference voltage line Vref3.

In the PMOS transistors 75, 76 that drive the reference voltage line Vref1, the gate terminal of the PMOS transistors 75 whose source terminal is connected to the power source 77 is connected to the circuit ground, and the logically inverted column selection signal (/column selection signal) is inputted into the gate terminal of the PMOS transistor 76 lying between the drain terminal of the PMOS transistor 75 and the reference voltage line Vref1. The gate widths W of the PMOS transistors 75, 76 are 6 µm.

In the NMOS transistors 78, 79 that drive the reference voltage line Vref3, the column selection signal is inputted into the gate terminal of the NMOS transistors 78 whose drain terminal is connected to the reference voltage line Vref3, and the gate terminal of the NMOS transistor 79 lying between the source terminal of the NMOS transistor 78 and the circuit ground is connected to the power source 77.

Next, in FIG. 22, the image data receiving circuit 6c has pre-charge circuits 80 instead of the pre-charge circuits 46 in the image data receiving circuit 6a shown in FIG. 6. In the pre-charge circuit 80, the pre-charge voltage is set to VDD/2. The other configuration is the same as that of FIG. 6.

Figure 23:
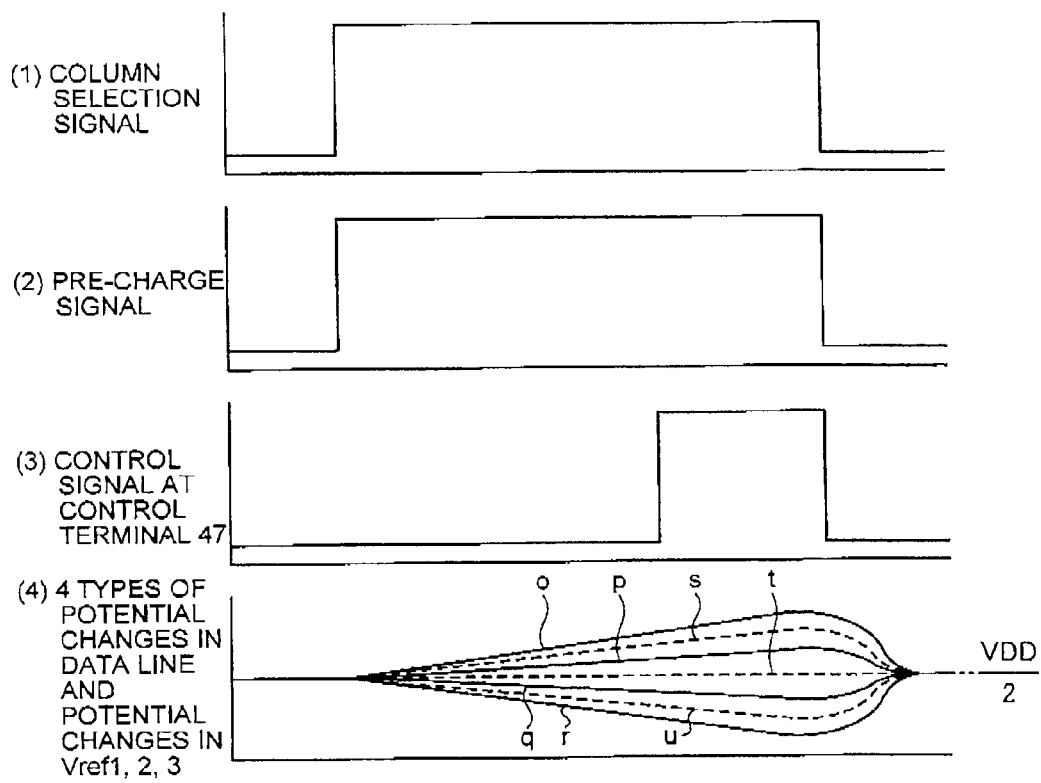
FIG. 23 is a waveform diagram for explaining potential changes in a data line and 3 reference voltage lines in the image data receiving circuit when transferring 2 bits of 2 columns.

Hereinafter, operations will be described with reference to FIGS. 23 and 24. FIG. 23 is a waveform diagram for explaining potential changes in the data line and the 3 reference voltage lines when transferring 2 bits of 2 columns. FIG. 24 is a waveform diagram for explaining potential changes in two nodes in each of the 3 differential amplifier circuits that receive 2-bit data.

In FIGS. 23 (1) and (2), by the pre-charge signal in a time period between the periods when the column selection signal is outputted, the pre-charge circuits 80 and 49 are turned on, and the data line 10 and the reference voltage lines Vref1, Vref2, and Vref3 are pre-charged to VDD/2, and further the control signal line 21 is pre-charged to the power source potential VDD. In a pre-charge period, the differential amplifier circuits 45a, 45b, and 45c are separated from the data line 10 and the reference voltage lines Vref1, Vref2, and Vref3.

In a period when the column selection signal is outputted to be high level, discharge of the control signal line 21 is performed through the control signal drive circuit 20, and as shown in FIG. 23 (3), the control signal appears at the control terminal 47 after a certain time elapses from when the column selection signal becomes high level. Based on this, the differential amplifier circuits 45a, 45b, and 45c become active. At this time, the PMOS transistors 54 and 55 are turned on, so that corresponding ones of the data line 10 and the reference voltage lines Vref1, Vref2, and Vref3 are respectively connected to the normal phase internal nodes D1, D2, and D3 and the reverse phase internal nodes /D1, /D2, and /D3 in the differential amplifier circuits 45a, 45b, and 45c.

On the other hand, in the data transfer circuit 18d and the reference voltage drive circuit 19c in a period when the column selection signal is high level, not only discharges but also charges of the data line 10 and the reference voltage lines Vref1, Vref2, and Vref3 are performed, so that the potential changes in the data line 10 and the reference voltage lines Vref1, Vref2, and Vref3 are as shown in FIG. 23 (4). In FIG. 23 (4), the solid lines indicate the potential changes in the data line 10 and the dashed lines indicate the potential changes in the reference voltage lines Vref1, Vref2, and Vref3.

The data transfer circuit 18d transfers one of the 4 types of combinations (0, 0), (0, 1), (1, 0), and (1, 1) of the 2 bits (Dn+1, Dn). FIG. 23 (4) shows characteristics of the potential changes o, p, q, and r of the data line 10 when the 4 types of combinations are transferred.

In the data transfer circuit 18d, when (Dn+1, Dn)=(0, 0), both the series circuit of the PMOS transistors 60, 61 and the series circuit of the PMOS transistors 66, 67 are turned on, connected to the data line 10 in parallel, and charge the data line 10 by the voltage VDD of the power source 64 through the gate width W=8 μm. The potential of the data line 10 rises from VDD/2 toward VDD as shown by the characteristics o.

When (Dn+1, Dn)=(0, 1), the series circuit of the PMOS transistors 66, 67 is turned on, and the data line 10 is charged by the voltage VDD of the power source 64 through the gate width W=4 μm. The potential of the data line 10 rises from VDD/2 toward VDD as shown by the characteristics p at a speed slower than that shown by the characteristics o.

When (Dn+1, Dn)=(1, 0), the series circuit of the NMOS transistors 62, 63 is turned on, and the data line 10 is discharged through the gate width W=2 μm. The potential of the data line 10 decreases from VDD/2 at a moderate speed as shown by the characteristics q.

When (Dn+1, Dn)=(1, 1), both the series circuit of the NMOS transistors 62, 63 and the series circuit of the NMOS transistors 68, 69 are turned on, connected to the data line 10 in parallel, and discharge the data line 10 through the gate width W=4 μm. The potential of the data line 10 decreases as shown by the characteristics r at a speed faster than the speed shown by the characteristics q.

In the reference voltage drive circuit 19c, the series circuit of the PMOS transistors 75, 76 charges the reference voltage line Vref1 by the voltage VDD of the power source 77 through the gate width W=6 μm, so that the potential of the reference voltage line Vref1 rises from VDD/2 toward VDD as shown by the characteristics s at an intermediate speed between the characteristics o and the characteristics p.

On the other hand, the series circuit of the PMOS transistors 78, 79 discharges the reference voltage line Vref3 through the gate width W=3 μm, so that the potential of the reference voltage line Vref3 decreases as shown by the characteristics u at an intermediate speed between the characteristics o and the characteristics r.

The reference voltage line Vref2 is not connected to the reference voltage drive circuit 19c and maintains the precharge voltage (VDD/2), so that the reference voltage line Vref3 has the characteristics t and indicates an intermediate potential between the characteristics p and the characteristics q.

As described above, in the same manner as in the first embodiment, the potentials of the reference voltage lines Vref1 and Vref3 driven by a reference voltage drive circuit 19d and the reference voltage line Vref2 of a fixed voltage (VDD/2) are intermediate potentials among the potentials of the data line 10 corresponding to the 4 types of bit patterns of the transferred 2 bits.

Next, in FIG. 24, FIGS. 24 (1), (2), and (3) are the same as FIGS. 23 (1), (2), and (3). FIG. 24 (4) shows the characteristics of the potential change p of the data line 10 shown in FIG. 23 (4) when the transferred 2 bits are (0, 1) and the characteristics s, t, and u of the reference voltage lines Vref1, Vref2, and Vref3 as a case in which the data transfer circuit 18d transfers one of the 4 types of combinations (0, 0), (0, 1), (1, 0), and (1, 1) of the 2 bits (Dn+1, Dn).

FIG. 24 (5) shows potential changes in the internal nodes (D1, /D1) of the differential amplifier circuit 45a to which the data line 10 and the reference voltage line Vref1 are connected. The dashed line indicates the potential change in the normal phase internal node D1 to which the reference voltage line Vref1 is connected and the solid line indicates the potential change in the reverse phase internal node /D1 to which the data line 10 is connected.

FIG. 24 (6) shows potential changes in the internal nodes (D2, /D2) of the differential amplifier circuit 45b to which the data line 10 and the reference voltage line Vref2 are connected. The dashed line indicates the potential change in the normal phase internal node D2 to which the reference voltage line Vref2 is connected and the solid line indicates the potential change in the reverse phase internal node /D2 to which the data line 10 is connected.

FIG. 24 (7) shows potential changes in the internal nodes (D3, /D3) of the differential amplifier circuit 45c to which the data line 10 and the reference voltage line Vref3 are connected. The dashed line indicates the potential change in the normal phase internal node D3 to which the reference voltage line Vref3 is connected and the solid line indicates the potential change in the reverse phase internal node /D3 to which the data line 10 is connected.

The logic levels of the normal phase internal nodes D1, D2, and D3 shown in FIGS. 24 (5), (6), and (7) are D1=1, D2=0, and D3=0. That is to say, in the same way as in the first and the second embodiments, the signal processing circuit 7 can identify one of the 4 types of combinations (1, 1), (1, 0), (0, 1), and (0, 0) of the transferred 2 bits (Dn+1, Dn) by acquiring the logic levels of the normal phase internal nodes D1, D2, and D3 of the differential amplifier circuits 45a, 45b, and 45c.

Here, the wiring of the data line 10 goes across the sample hold signal conversion circuit group 4d, so that the characteristics of the potential change in the data line 10 are affected by parasitic resistance and parasitic capacitance of the wiring. However, the data line 10, the reference voltage lines Vref1 and Vref3, and the control signal line 21 are configured to be controlled by circuits present in the same column. Therefore, relative potential differences between the data line 10 and the reference voltage lines Vref1, Vref2, and Vref3 and a timing when the differential amplifier circuits 45a, 45b, and 45c are activated are difficult to be affected by the parasitic resistance and the parasitic capacitance of the wiring. Therefore, the signal processing circuit 7 can read the transferred 2 bits (Dn+1, Dn) from the outputs of the normal phase internal nodes D1, D2, and D3 of the differential amplifier circuits 45a, 45b, and 45c with less errors.

As described above, according to the fourth embodiment, 2 bits can be transferred at the same time for each 2 columns in the pixel array 2, so that the number of transfer times can be halved and the transfer time can be reduced. In summary, from the embodiments described above, it can be understood that digitalized image data can be collected into units of a plurality of bits and transferred to a signal processing circuit by using a multi-level data line and reduction of the circuit scale and reduction of the transfer time can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
a plurality of vertical signal lines, each of which is arranged for each column in a pixel array and transmits a pixel signal from a pixel;
a column selection circuit that outputs a column selection signal which collectively and sequentially selects N columns (N≧2) in the pixel array at a predetermined time interval;
a sample hold signal conversion circuit that includes a plurality of analog-digital converters to which the image signals are inputted from the plurality of vertical signal lines in a one-to-one relationship with the analog-digital converters, and a plurality data transfer circuits that transfer n bits for each n columns (n≧2) in the pixel array among digital data of a predetermined number of bits converted by each of the plurality of analog-digital converters by using one data line according to the column selection signal;
a plurality of reference voltage drive circuits that are arranged in one-to-one relationship with the data transfer circuits in a row direction and each of which individually drives common $2^n-1$ reference voltage lines in accordance with the column selection signal; and
a plurality of differential amplifier circuits that are provided in an input stage of a signal processing circuit that receives digital data from the sample hold signal conversion circuit and include $2^n-1$ differential amplifier circuits provided for each of the data transfer circuits which are arranged in a column direction and the number of which is the same as the number of bits of the digital data, where the one data line is commonly connected to one differential input terminals of the $2^n-1$ differential amplifier circuits, and corresponding one of the $2^n-1$ reference voltage lines is individually connected to the other differential input terminals.

2. The solid-state imaging device according to claim 1, further comprising:
a plurality of control signal drive circuits that drives in parallel one control signal line, which is connected in parallel to control terminals provided for each of the $2^n-1$ differential amplifier circuits in the plurality of differential amplifier circuits and transmits a control signal that collectively activates the $2^{n-1}$ differential amplifier circuits provided to the control terminals and, in accordance with the same column selection signal that operates the data transfer circuit.

3. The solid-state imaging device according to claim 2, wherein
the control signal drive circuit includes 2 MOS transistors connected in series between the control signal line and a circuit ground,
the column selection signal from the column selection circuit is commonly inputted into the gate terminal of MOS transistor on the side of the control signal line, and
a MOS transistor on the side of the circuit ground is turned on at all times.

4. The solid-state imaging device according to claim 1, wherein when n=2, the data transfer circuit includes 2 pairs of 2 MOS transistors connected in series between the one data line and a circuit ground,
a gate width of one pair of 2 MOS transistors and a gate width of the other pair of 2 MOS transistors are set to values different from each other,
the column selection signal from the column selection circuit is commonly inputted into each gate terminal of 2 MOS transistors on the side of the one data line, and
in 2 MOS transistors on the side of the circuit ground, 1-bit data of an nth column is inputted into the gate terminal of one MOS transistor and 1-bit data of an (n+1)th column is inputted into the gate terminal of the other MOS transistor.

5. The solid-state imaging device according to claim 1, wherein
when n=2, the reference voltage drive circuit includes 3 pairs of 2 MOS transistors connected in series between each of 3 reference voltage lines and a circuit ground,
gate widths of the 3 pairs of 2 MOS transistors connected in series are set to values different from each other among the 3 pairs,
the column selection signal from the column selection circuit is commonly inputted into each gate terminal of 3 MOS transistors on the side of the reference voltage line, and
3 MOS transistors on the side of the circuit ground are turned on at all times.

6. A solid-state imaging device comprising:
a plurality of vertical signal lines, each of which is arranged for each column in a pixel array and transmits a pixel signal from a pixel;
a column selection circuit that outputs a column selection signal which sequentially selects each column in the pixel array at a predetermined time interval;
a sample hold signal conversion circuit that includes a plurality of analog-digital converters to which the image signals are inputted from the plurality of vertical signal lines in a one-to-one relationship with the analog-digital converters, and a plurality data transfer circuits that transfer n bits (n≧1) in a column direction for each column selection signal among digital data of a predetermined number of bits converted by each of the plurality of analog-digital converters by using one data line;
a plurality of reference voltage drive circuits that are provided in one-to-one relationship with the data transfer circuits arranged in a row direction and each of which individually drives common $2^n-1$ reference voltage lines in accordance with the column selection signal; and
a plurality of differential amplifier circuits that are provided in an input stage of a signal processing circuit that receives digital data from the sample hold signal conversion circuit and include $2^n-1$ differential amplifier circuits provided for each of the data transfer circuits which are arranged for each n bits of the digital data in a column direction, where the one data line is commonly and correspondingly connected to one differential input terminals of the $2^n-1$ differential amplifier circuits, and corresponding one of the $2^n-1$ reference voltage lines is individually connected to the other differential input terminals.

7. The solid-state imaging device according to claim 6, further comprising:
a plurality of control signal drive circuits that drives in parallel one control signal line, which is connected in parallel to control terminals provided for each of the $2^n-1$ differential amplifier circuits in the plurality of differential amplifier circuits and transmits a control signal that collectively activates the $2^n-1$ differential amplifier circuits provided to the control terminals and, in accordance with the same column selection signal that operates the data transfer circuit.

8. The solid-state imaging device according to claim 7, wherein
the control signal drive circuit includes 2 MOS transistors connected in series between the control signal line and a circuit ground,
the column selection signal from the column selection circuit is commonly inputted into the gate terminal of MOS transistor on the side of the control signal line, and
a MOS transistor on the side of the circuit ground is turned on at all times.

9. The solid-state imaging device according to claim 6, wherein
when n=2, the data transfer circuit includes 2 pairs of 2 MOS transistors connected in series between the one data line and a circuit ground,
a gate width of one pair of 2 MOS transistors and a gate width of the other pair of 2 MOS transistors are set to values different from each other,
the column selection signal from the column selection circuit is commonly inputted into each gate terminal of 2 MOS transistors on the side of the one data line, and
2 bit data next to each other in the same column are respectively inputted into gate terminals of 2 MOS transistors on the side of the circuit ground.

10. The solid-state imaging device according to claim 6, wherein
when n=2, the reference voltage drive circuit includes 3 pairs of 2 MOS transistors connected in series between each of 3 reference voltage lines and a circuit ground,
gate widths of the 3 pairs of 2 MOS transistors connected in series are set to values different from each other among the 3 pairs,
the column selection signal from the column selection circuit is commonly inputted into each gate terminal of 3 MOS transistors on the side of the reference voltage line, and
3 MOS transistors on the side of the circuit ground are turned on at all times.

11. The solid-state imaging device according to claim 6, wherein
when n=1, the data transfer circuit includes 2 MOS transistors connected in series between the one data line and a circuit ground,
the column selection signal from the column selection circuit is inputted into the gate terminal of MOS transistor on the side of the one data line, and
1-bit data is inputted into the gate terminal of MOS transistor on the side of the circuit ground.

12. The solid-state imaging device according to claim 6, wherein
when n=1, the reference voltage drive circuit includes 2 MOS transistors connected in series between one reference voltage line and a circuit ground,
the column selection signal from the column selection circuit is inputted into the gate terminal of MOS transistor on the side of the one reference voltage line, and
MOS transistor on the side of the circuit ground is turned on at all times.

13. A solid-state imaging device comprising:
a plurality of vertical signal lines, each of which is arranged for each column in a pixel array and transmits a pixel signal from a pixel;
a column selection circuit that outputs a column selection signal which collectively and sequentially selects N columns (N≧2) in the pixel array at a predetermined time interval;
a sample hold signal conversion circuit that includes a plurality of analog-digital converters to which the image signals are inputted from the plurality of vertical signal lines in a one-to-one relationship with the analog-digital converters, and a plurality data transfer circuits that transfer n bits for each n columns (n≧2) in the pixel array among digital data of a predetermined number of bits converted by each of the plurality of analog-digital converters by using one data line according to the column selection signal;
a plurality of reference voltage drive circuits that are provided in one-to-one relationship with the data transfer circuits arranged in a row direction and each of which individually drives common $2^n-2$ reference voltage lines in accordance with the column selection signal; and
a plurality of differential amplifier circuits that are provided in an input stage of a signal processing circuit that receives digital data from the sample hold signal conversion circuit and include $2^n-1$ differential amplifier circuits provided for each of the data transfer circuits which are arranged in a column direction and the number of which is the same as the number of bits of the digital data, where the one data line is commonly and correspondingly connected to one differential input terminals of the $2^n-1$ differential amplifier circuits, and corresponding one of the $2^n-2$ reference voltage lines and one reference voltage line to which a fixed voltage is applied is individually connected to the other differential input terminals.

14. The solid-state imaging device according to claim 13, further comprising:
a plurality of control signal drive circuits that drives in parallel one control signal line, which is connected in parallel to control terminals provided for each of the $2^n-1$ differential amplifier circuits in the plurality of differential amplifier circuits and transmits a control signal that collectively activates the $2^n-1$ differential amplifier circuits provided to the control terminals and, in accordance with the same column selection signal that operates the data transfer circuit.

15. The solid-state imaging device according to claim 14, wherein
the control signal drive circuit includes 2 MOS transistors connected in series between the control signal line and a circuit ground,
the column selection signal from the column selection circuit is commonly inputted into the gate terminal of MOS transistor on the side of the control signal line, and
a MOS transistor on the side of the circuit ground is turned on at all times.

16. The solid-state imaging device according to claim 13, wherein
when n=2, the data transfer circuit includes
a first MOS transistor in which one terminal is connected to a power source and bit data of (n+1)th column is inputted into the gate terminal,
a second MOS transistor in which one terminal is connected to the other terminal of the first MOS transistor and a logically inverted signal of the column selection signal from the column selection circuit is inputted into the gate terminal, a third MOS transistor in which one terminal is connected to the other terminal of the second MOS transistor and the column selection signal from the column selection circuit is inputted into the gate terminal, a fourth MOS transistor that is disposed between the other terminal of the third MOS transistor and a circuit ground and in which bit data of (n+1)th column is inputted into the gate terminal, a NAND circuit into which logically inverted bit data of the bit data of (n+1)th column and logically inverted bit data of the bit data of nth column are inputted, a fifth MOS transistor in which one terminal is connected to a power source and an output of the NAND circuit is inputted into the gate terminal, a sixth MOS transistor in which one terminal is connected to the other terminal of the fifth MOS transistor and a logically inverted signal of the column selection signal from the column selection circuit is inputted into the gate terminal, a seventh MOS transistor in which one terminal is connected to the other terminal of the sixth MOS transistor and the column selection signal from the column selection circuit is inputted into the gate terminal, a NOR circuit into which logically inverted bit data of the bit data of (n+1)th column and logically inverted bit data of the bit data of nth column are inputted, and an eighth MOS transistor that is disposed between the other terminal of the seventh MOS transistor and a circuit ground and in which an output of the NOR circuit is inputted into the gate terminal, wherein a gate width of the first, the second, the fifth, and the sixth MOS transistors and a gate width of the third, the fourth, the seventh, and the eighth MOS transistors are set to values different from each other, and a common connection terminal of the second and the third MOS transistors and a common connection terminal of the sixth and the seventh MOS transistors are commonly connected to the one data line.

17. The solid-state imaging device according to claim 13, wherein when n=2, the reference voltage drive circuit includes a first MOS transistor in which one terminal is connected to one of two reference voltage lines and a logically inverted signal of the column selection signal from the column selection circuit is inputted into the gate terminal, a second MOS transistor that is disposed between the other terminal of the first MOS transistor and a power source and turned on at all times, a third MOS transistor in which one terminal is connected to the other one of the two reference voltage lines and the column selection signal from the column selection circuit is inputted into the gate terminal, and a fourth MOS transistor that is disposed between the other terminal of the third MOS transistor and a circuit ground and turned on at all times, wherein a gate width of the first and the second MOS transistors and a gate width of the third and the fourth MOS transistors are set to values different from each other.

18. The solid-state imaging device according to claim 13, wherein the fixed voltage applied to the one reference voltage line is a half of a power source voltage.

19. The solid-state imaging device according to claim 1, wherein the data line is a single line.

20. The solid-state imaging device according to claim 6, wherein the data line is a single line.

21. The solid-state imaging device according to claim 13, wherein the data line is a single line.

* * * * *